(12) United States Patent
Kanada et al.

(10) Patent No.: US 11,820,714 B2
(45) Date of Patent: Nov. 21, 2023

(54) CARBON FOAM, ASSEMBLY AND MANUFACTURING METHOD

(71) Applicant: ASAHI KASEI KABUSHIKI KAISHA, Tokyo (JP)

(72) Inventors: Yuka Kanada, Tokyo (JP); Atsushi Suzuki, Tokyo (JP); Junya Yamashita, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 514 days.

(21) Appl. No.: 17/261,574

(22) PCT Filed: Aug. 30, 2019

(86) PCT No.: PCT/JP2019/034194
§ 371 (c)(1),
(2) Date: Jan. 20, 2021

(87) PCT Pub. No.: WO2020/045645
PCT Pub. Date: Mar. 5, 2020

(65) Prior Publication Data
US 2021/0292242 A1    Sep. 23, 2021

(30) Foreign Application Priority Data

Aug. 31, 2018 (JP) .................... 2018-163652

(51) Int. Cl.
*C04B 35/524* (2006.01)
*C01B 32/20* (2017.01)
(Continued)

(52) U.S. Cl.
CPC ............ *C04B 35/524* (2013.01); *C01B 32/20* (2017.08); *C01P 2002/85* (2013.01);
(Continued)

(58) Field of Classification Search
CPC ............ C04B 35/524; C04B 35/63444; C04B 35/645; C04B 2111/00853;
(Continued)

(56) References Cited

U.S. PATENT DOCUMENTS

| | | | |
|---|---|---|---|
| 6,339,031 B1 * | 1/2002 | Tan | ...................... C04B 38/0022 428/315.7 |
| 2005/0281730 A1 * | 12/2005 | Theriault | ............ C04B 38/0054 264/29.7 |

(Continued)

FOREIGN PATENT DOCUMENTS

| | | |
|---|---|---|
| CN | 102422471 A | 4/2012 |
| CN | 103626513 A | 3/2014 |

(Continued)

OTHER PUBLICATIONS

Nov. 19, 2019, International Search Report issued in the International Patent Application No. PCT/JP2019/034194.
(Continued)

*Primary Examiner* — Daniel C. McCracken
(74) *Attorney, Agent, or Firm* — KENJA IP LAW PC

(57) ABSTRACT

A carbon foam formed of carbon fibers, where, at 90% or more of any 20 locations, the carbon fibers have a fiber diameter that is within ±20% of an average fiber diameter.

20 Claims, 11 Drawing Sheets

(51) Int. Cl.
*H01G 11/40* (2013.01)
*H01M 8/1041* (2016.01)
*H01M 8/1065* (2016.01)
*H01M 8/1067* (2016.01)
*H01M 8/18* (2006.01)

(52) U.S. Cl.
CPC ...... *C01P 2004/03* (2013.01); *C01P 2006/12* (2013.01); *H01G 11/40* (2013.01); *H01M 8/1041* (2013.01); *H01M 8/1065* (2013.01); *H01M 8/1067* (2013.01); *H01M 8/18* (2013.01)

(58) Field of Classification Search
CPC ........ C04B 2235/48; C04B 2235/5248; C04B 2235/5264; C04B 2235/6562; C04B 2235/6567; C04B 2235/658; C04B 2235/6581; C04B 2235/6586; C04B 2235/723; C04B 2235/77; C04B 38/0032; C04B 38/00; C01B 32/20; C01P 2002/85; C01P 2004/03; C01P 2006/12; C01P 2002/70; H01G 11/40; H01G 11/26; H01G 11/70; H01G 11/02; H01M 8/1041; H01M 8/1065; H01M 8/1067; H01M 8/18; H01M 4/96; H01M 8/0234; H01M 8/1004; H01M 8/1009; H01M 8/1011; H01M 8/188; H01M 8/10; C25B 1/04; C25B 9/23; C25B 11/031; C25B 11/043; Y02E 60/36; Y02E 60/50
See application file for complete search history.

(56) References Cited

U.S. PATENT DOCUMENTS

| | | |
|---|---|---|
| 2006/0014908 A1 | 1/2006 | Rotermund et al. |
| 2008/0031803 A1 | 2/2008 | Yano et al. |
| 2011/0020630 A1 | 1/2011 | Gladysz et al. |
| 2012/0115063 A1 | 5/2012 | Sumioka et al. |
| 2014/0170370 A1 | 6/2014 | Horii et al. |
| 2018/0179347 A1 | 6/2018 | Bae et al. |
| 2020/0010322 A1* | 1/2020 | Suzuki ................. C04B 35/524 |
| 2020/0161670 A1 | 5/2020 | Yamashita et al. |
| 2020/0243866 A1 | 7/2020 | Suzuki et al. |

FOREIGN PATENT DOCUMENTS

| | | |
|---|---|---|
| CN | 103649015 A | 3/2014 |
| DE | 10243240 A1 | 3/2004 |
| EP | 2881413 A1 | 6/2015 |
| EP | 3546435 A1 | 10/2019 |
| EP | 3597618 A1 | 1/2020 |
| JP | S61270268 A | 11/1986 |
| JP | S61275116 A | 12/1986 |
| JP | S62132717 A | 6/1987 |
| JP | S62162611 A | 7/1987 |
| JP | H04349178 A | 12/1992 |
| JP | H09167621 A | 6/1997 |
| JP | 2002326871 A | 11/2002 |
| JP | 2004217446 A | 8/2004 |
| JP | 2005179120 A | 7/2005 |
| JP | 2006097221 A | 4/2006 |
| JP | 2006512265 A | 4/2006 |
| JP | 2010006628 A | 1/2010 |
| JP | 2011122254 A | 6/2011 |
| JP | 2014121838 A | 7/2014 |
| WO | 2018096895 A1 | 5/2018 |
| WO | 2018168741 A1 | 9/2018 |
| WO | WO 2018/168741 * | 9/2018 ........... C04B 35/524 |
| WO | 2019069570 A1 | 4/2019 |

OTHER PUBLICATIONS

Mar. 2, 2021, International Preliminary Report on Patentability issued in the International Patent Application No. PCT/JP2019/034194.

Sep. 27, 2021, the Supplementary European Search Report issued by the European Patent Office in the corresponding European Patent Application No. 19855708.4.

* cited by examiner

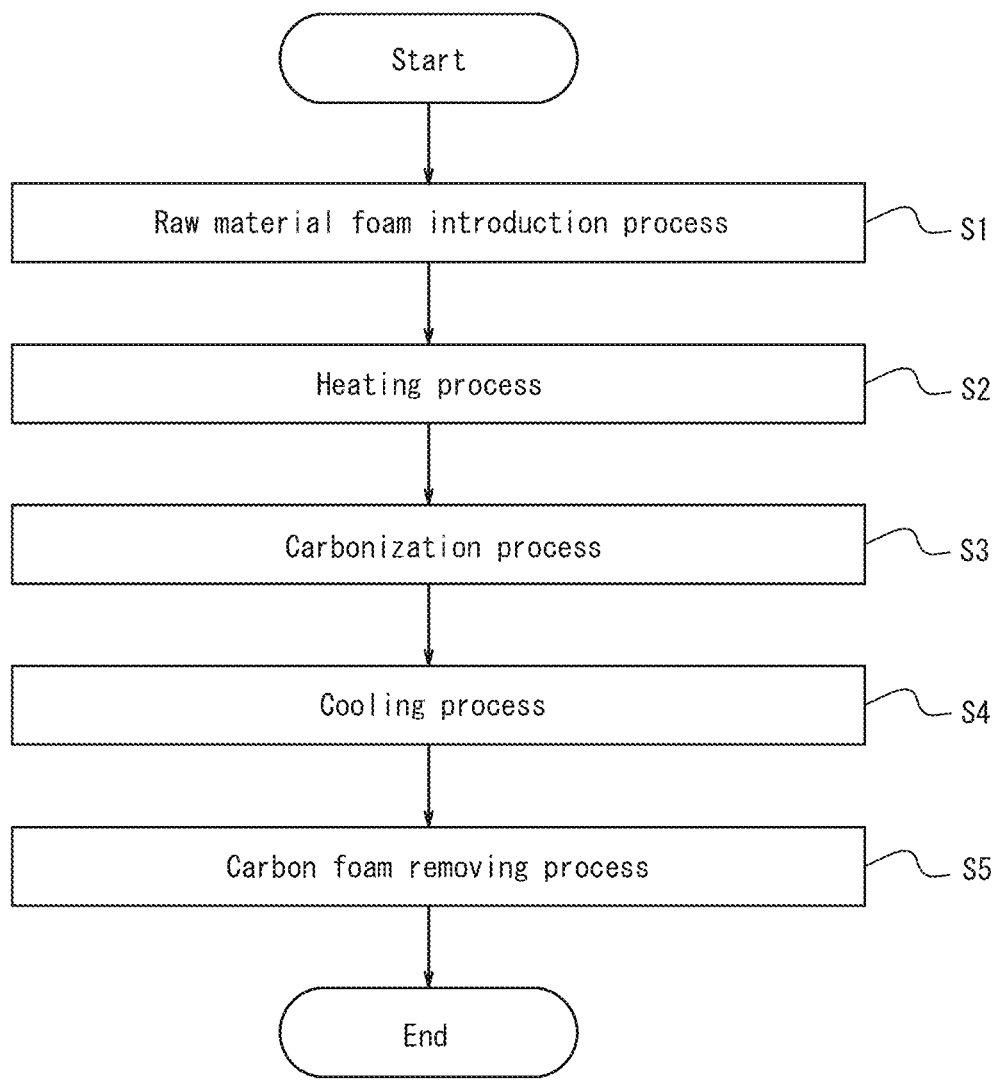

CARBON FOAM, ASSEMBLY AND MANUFACTURING METHOD

CROSS-REFERENCE TO RELATED APPLICATIONS

This application claims priority to and the benefit of Japanese Patent Application No. 2018-163652 filed on Aug. 31, 2018, the entire content of which is incorporated herein by reference.

TECHNICAL FIELD

This disclosure relates to a carbon foam, particularly to a homogeneous carbon foam.

BACKGROUND

Carbon foam is a material obtained, for example, by subjecting a melamine resin foam (foam) to heat treatment in an inert gas atmosphere to carbonize the foam (for example, see JP H04-349178 A (PTL 1)), and it is used in various applications because of its porosity, flexibility and electrical properties. The carbon foam is significantly different from common carbon fiber nonwoven fabric in the following aspects: the carbon foam has a small fiber diameter, so that its specific surface area is large; and the carbon foam has an integral structure in which all the fibers are connected.

For example, JP 2002-326871 A (PTL 2) describes using a carbon foam as a filter which is used under special conditions such as high temperatures or drug uses. In addition, JP 2004-217446 A (JPL 3) describes using a carbon foam as a heat insulating material having high heat insulating properties even at high temperatures. Further, JP H09-167621 A (PTL 4) describes using a carbon foam as an electrode having high electrical activity and conductivity. Moreover, WO 2018/096895 A1 (PTL 5) describes a method of manufacturing a carbon foam having good properties in a large area.

CITATION LIST

Patent Literature

PTL 1: JP H04-349178 A
PTL 2: JP 2002-326871 A
PTL 3: JP 2004-217446 A
PTL 4: JP H09-167621 A
PTL 5: WO 2018/096895 A1

SUMMARY

Technical Problem

However, in the case of using a carbon foam as an electrode as described above, it should be noted that cells are often formed in a certain size, and the carbon foam is required to have good cell resistance. Further, in the case of using a carbon foam as a filter having a large diameter, the carbon foam is required to have good permeation performance while guaranteeing necessary blocking performance.

However, it has been understood that, when a carbon foam is manufactured with the method described in PTL 1, the structure of the carbon foam is uneven, and the method described in PTL 1 cannot produce a carbon foam having good cell resistance or a carbon foam having good blocking performance and permeation performance.

It could thus be helpful to provide an overall homogeneous carbon foam.

Solution to Problem

We made an intensive study on solutions to the above problems. As described above, it has been found difficult to prepare an overall homogeneous carbon foam with the method of PTL 1.

Therefore, in order to establish a method of preparing an overall homogeneous carbon foam, we have analyzed and examined the mechanism of occurrence of inhomogeneity when a carbon foam is prepared with the method of PTL 1.

During the preparation of a carbon foam, the main reason why a resin foam as a raw material is carbonized in an inert gas atmosphere or in a vacuum is that this can prevent oxygen contained in air reacting with carbon fibers obtained by carbonization and prevent the carbon fibers from burning. Although the method of PTL 1 tries to prevent the carbon fibers from burning, it is considered that inhomogenization occurs due to partial burning.

We have investigated in detail the reason why the method of PTL 1 causes inhomogenization. As a result, we found that, when the resin foam as a raw material is heated, gas is desorbed from the resin foam, and the desorbed gas functions as an active gas, reacts with the carbon fibers, and decomposes the carbon fibers, thereby causing inhomogenization.

It is considered that, during the preparation of a carbon foam, a decomposition gas is generated inside the resin foam, and it reacts with the carbon fibers and partially decomposes the carbon fibers before diffusing out of the foam structure, thereby causing inhomogenization.

We made an intensive study on the conditions for manufacturing a carbon foam without causing the above-mentioned homogenization. As a result, we discovered that it is extremely effective to promote the diffusion of decomposition gas generated inside the resin foam to the outside of the foam structure by decompressing and evacuating the inside of a heat treatment furnace in a temperature range where a large amount of decomposition gas is generated during the heating and carbonization of the resin foam. The present disclosure is completed based on this discovery.

In addition, we discovered that the carbon foam of the present disclosure has a small carbon fiber diameter, a large surface area, and a structure where the carbon fibers are three-dimensionally continuous, and the carbon foam is suitable for applications such as electrodes where the movement of electrons has an effect in performance. For example, it can be used in various applications such as a redox flow battery, a water splitting device with a solid polymer membrane, and a direct methanol fuel cell. The electrodes of these batteries generally have a structure in which porous electrodes are arranged on both sides of an ion exchange membrane, and current collectors are further arranged on the outside. These batteries guarantee the electrical contact between the electrodes and the current collectors, which greatly affects the battery performance. We discovered that, by using a membrane electrode assembly in which the homogeneous carbon foam of the present disclosure is joined to an ion exchange membrane, sufficient contact can be guaranteed between the electrode surface and the current collector, and a good battery with low cell resistance can be formed. The present disclosure is completed based on this discovery.

Specifically, the present disclosure provides the following.

[1]

A carbon foam formed of carbon fibers, wherein
at 90% or more of any 20 locations, the carbon fibers have a fiber diameter that is within ±20% of an average fiber diameter.

[2]

A carbon foam formed of carbon fibers, wherein
at any 5 locations on a surface, a weight per unit area of 3 cm×3 cm is within ±50% of an average value of weight per unit area.

[3]

The carbon foam according to [1] or [2], having a surface of 150 $cm^2$ or more.

[4]

The carbon foam according to any one of [1] to [3], wherein an average fiber diameter of the carbon fibers is 0.1 μm or more and 5.0 μm or less.

[5]

The carbon foam according to any one of [1] to [4], wherein
among carbon atoms measured by surface analysis by X-ray photoelectron spectroscopy, a proportion of graphite is 70 at % or more and 80 at % or less.

[6]

The carbon foam according to any one of [1] to [5], wherein
among carbon atoms measured by surface analysis by X-ray photoelectron spectroscopy, a proportion of carbon atoms having a hydroxy group is 5 at % or more and 15 at % or less.

[7]

The carbon foam according to any one of [1] to [6], wherein
among carbon atoms measured by surface analysis by X-ray photoelectron spectroscopy, a proportion of carbon atoms forming a carbonyl group is 9 at % or more and 15 at % or less.

[8]

The carbon foam according to any one of [1] to [7], wherein
among carbon atoms measured by surface analysis by X-ray photoelectron spectroscopy, a proportion of carbon atoms forming a carboxy group is 0.1 at % or more and 5.0 at % or less.

[9]

An assembly, which is a laminate in which at least a part of the carbon foam according to [1] is adhered to at least one surface of an ion exchange membrane having a first surface and a second surface.

[10]

The assembly according to [9], wherein two or more pieces of the carbon foam are adhered to one surface of the ion exchange membrane.

[11]

The assembly according to [9], which is a laminate in which the carbon foam is adhered to the first surface and the second surface.

[12]

The assembly according to [9], which is a laminate in which 30% or more of a surface of the carbon foam is adhered to the ion exchange membrane.

[13]

The assembly according to [9], wherein
two or more pieces of the carbon foam are adhered to one surface of the ion exchange membrane, and
for the two or more pieces of carbon foam, a void between two pieces of carbon foam adjacent to each other is 10 mm or less.

[14]

The assembly according to [9], wherein
two or more pieces of the carbon foam are adhered to one surface of the ion exchange membrane, and
for the two or more pieces of carbon foam, a void ratio between two pieces of carbon foam adjacent to each other is 5% or less.

[15]

The assembly according to [9], wherein
the ion exchange membrane has a membrane thickness of 1 μm or more and 100 μm or less.

[16]

The assembly according to [9], wherein
the ion exchange membrane has a membrane thickness that is within ±20% of an average membrane thickness.

[17]

The assembly according to [9], wherein
on an adhesive surface between the carbon foam and the ion exchange membrane, an embedding depth of the carbon foam in the ion exchange membrane is 5 μm or less.

[18]

The assembly according to [9], wherein
two or more pieces of the carbon foam having different oxidation states on carbon surfaces are adhered to at least one surface of the ion exchange membrane.

[19]

A method of manufacturing the assembly according to [9], wherein
the ion exchange membrane and the carbon foam are thermocompression bonded under a temperature condition of Tg of the ion exchange membrane+50° C. or lower.

Advantageous Effect

According to the present disclosure, it is possible to provide an overall homogeneous carbon foam.

BRIEF DESCRIPTION OF THE DRAWINGS

In the accompanying drawings:

FIG. 2 is a flow chart of a method of manufacturing the carbon foam of the present disclosure;

DETAILED DESCRIPTION

Figure 1A:
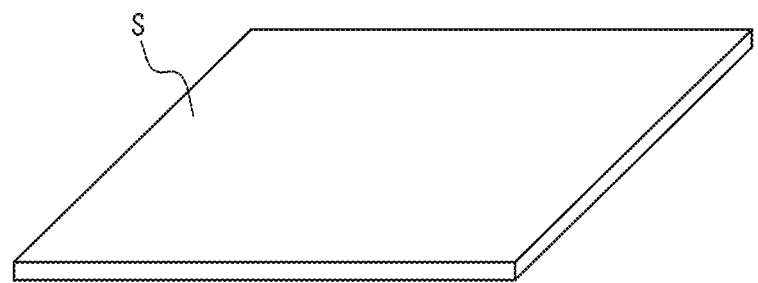
FIG. 1A illustrates an example of carbon foam included in the present embodiment.

The following provides a detailed description of embodiments of the present disclosure (hereinafter, referred to as "present embodiment"). However, the present disclosure is not limited by the following description and may be implemented with various alterations within the essential scope thereof.

First Embodiment of the Present Disclosure (Carbon Foam)

The carbon foam of the present disclosure is a carbon foam formed of carbon fibers. Further, the carbon foam of the present disclosure is homogeneous overall. Being homogeneous overall means, for example, that at least one of the fiber diameter of the carbon fiber and the weight per unit area is homogeneous overall, as described below.

<Homogeneity of Fiber Diameter>

For the carbon foam of the present disclosure, the fiber diameter of the carbon fibers at 90% or more of any 20 locations, in other words, at 18 or more locations, is within ±20% of an average fiber diameter. The average fiber diameter is an average value of the fiber diameters of the carbon fibers at the any 20 locations. The any 20 locations may be on the surface of the carbon foam or inside the carbon foam. For example, the any 20 locations may be selected from either an end or the center of the carbon foam.

<Homogeneity of Weight Per Unit Area>

For the carbon foam of the present disclosure, the weight per unit area of 3 cm×3 cm at any 5 locations on a plate surface of the carbon foam is within ±50% of an average value of the weight per unit area. The average value of the weight per unit area is an average value of the weight per unit area at the any 5 positions. For example, the any 5 positions may each be selected from each end or center of four sides in a structure where the carbon foam is rectangular, for example.

<Density of Node Portion>

The carbon foam of the present disclosure preferably has linear portions and node portions joining the linear portions. From the viewpoint of resilience when applied with a compressive load, the density of the node portions of the carbon foam is preferably 15,000/mm$^3$ or more, more preferably 20,000/mm$^3$ or more, and further preferably 30,000/mm$^3$ or more. In addition, from the viewpoint of the flexibility of the carbon foam, the density of the node portions of the carbon foam is preferably 5,000,000/mm$^3$ or less, more preferably 4,000,000/mm$^3$ or less, and further preferably 3,000,000/mm$^3$ or less.

It is preferable that at least a part of the carbon foam of the present embodiment have a location satisfying the above node portion density ranges. It is more preferable that 50 vol. % of the carbon foam satisfy the above density ranges, further preferable that 75 vol. % of the carbon foam satisfy the above density ranges, and particularly preferable that any location in the carbon foam satisfy the above density ranges.

<Surface Area>

The carbon foam of the present embodiment may have a surface of 150 cm$^2$ or more. The surface area of the carbon foam is more preferably 225 cm$^2$ or more and even more preferably 600 cm$^2$ or more. The "surface area" in the present embodiment means a sheet area of the carbon foam and can be measured with a ruler or the like.

The carbon foam may be, for example, in a plate shape. In the plate-like structure, the surface of 150 cm$^2$ or more may be, for example, a flat surface. The shape of the carbon foam is not limited to a plate shape, and may be, for example, a cylindrical shape. In the cylindrical structure, the surface of 150 cm$^2$ or more may be a curved surface. Further, the surface of 150 cm$^2$ or more may be subjected to a surface treatment such as embossing. In such a structure, the area of the surface is an area viewed from the vertical direction of the surface without taking into account the surface area increased by embossing.

<Fiber Diameter of Carbon Fiber>

For the carbon foam of the present embodiment, the average fiber diameter of the carbon fibers may be 0.1 μm or more and 5.0 μm or less. In the present disclosure, the fiber diameter of the carbon fiber is the diameter of a linear portion connecting node portions. When the average fiber diameter of the carbon fibers is 0.1 μm or more, physical strength and conductivity can be secured. The average fiber diameter is preferably 1.0 μm or more, more preferably 1.5 μm or more, and even more preferably 2 μm or more. In addition, when the average fiber diameter of the carbon fibers is 5 μm or less, deformability and resilience when applied with a compression behavior can be secured. The average fiber diameter is preferably 4 μm or less and more preferably 3.5 μm or less.

<Surface Functional Group Concentration>

For the carbon foam of the present embodiment, the proportion of graphite in the carbon atoms measured by X-ray photoelectron spectroscopy may be 70 at % or more and 80 at % or less. When the proportion is 70 at % or more, the resistance can be stably maintained at a low level against long-term charge/discharge in a configuration where the carbon foam is used as an electrode of a secondary battery. In addition, when the proportion is 80 at % or less, the wettability to an electrolytic solution is good.

For the carbon foam of the present embodiment, alternatively or additionally, the proportion of carbon atoms having a hydroxy group among the carbon atoms measured by X-ray photoelectron spectroscopy may be 5 at % or more and 15 at % or less. When the proportion is 5 at % or more, the wettability to an electrolytic solution is good. The proportion is more preferably 7 at % or more and further preferably 10 at % or more. In addition, when the proportion is 15 at % or less, the resistance can be stably maintained at a low level against long-term charge/discharge in a configuration where the carbon foam is used as an electrode of a secondary battery. The proportion is more preferably 14 at % or less and further preferably 13 at % or less.

For the carbon foam of the present embodiment, alternatively or additionally, the proportion of carbon atoms forming a carbonyl group among the carbon atoms measured by X-ray photoelectron spectroscopy may be 9 at % or more and 15 at % or less. When the proportion is 9 at % or more, the wettability to an electrolytic solution is good. In addition, when the proportion is 15 at % or less, the resistance can be stably maintained at a low level against long-term charge/discharge in a configuration where the carbon foam is used as an electrode of a secondary battery.

For the carbon foam of the present embodiment, alternatively or additionally, the proportion of carbon atoms forming a carboxy group among the carbon atoms measured by X-ray photoelectron spectroscopy may be 0.1 at % or more and 5 at % or less. When the proportion is 0.1 at % or more, the wettability to an electrolytic solution is good. The proportion is more preferably 0.5 at % or more and further preferably 1.0 at % or more. In addition, when the proportion is 5 at % or less, the resistance can be stably maintained at a low level against long-term charge/discharge in a configuration where the carbon foam is used as an electrode of a secondary battery.

For the carbon foam of the present embodiment, alternatively or additionally, the total proportion of carbon atoms having a hydroxy group, carbon atoms forming a carbonyl group and carbon atoms forming a carboxy group among the carbon atoms measured by X-ray photoelectron spectroscopy may be 10 at % or more and 40 at % or less. When the total is 10 at % or more, the wettability to an electrolytic solution is improved, thereby obtaining good battery performance. The total is more preferably 17 at % or more and further preferably 21 at % or more. In addition, when the total is 40 at % or less, a decrease in the strength of the carbon foam can be suppressed. The total is more preferably 35 at % or less and further preferably 30 at % or less.

In the present embodiment, the surface functional group concentration can be adjusted by, after forming a homogeneous carbon foam, subjecting the carbon foam to heat treatment in the presence of, for example, a gas containing oxygen such as dry air. With respect to surface oxidation of carbon materials, the oxidation generally progresses by eroding the surface. Having a small fiber diameter is important for obtaining flexibility and high surface area for the carbon foam of the present embodiment. Therefore, from the viewpoint of suppressing a decrease in strength and obtaining a low-resistance carbon foam, it is important to homogeneously carbonize a raw material resin foam and to sufficiently control oxidation treatment conditions to suppress a decrease in the fiber diameter.

From the viewpoint of conductivity, the carbon content of the carbon foam of the present embodiment is preferably 51 mass % or more, 60 mass % or more, 70 mass % or more, 80 mass % or more, 85 mass % or more, more preferably 90 mass % or more, and further preferably 98 mass % or more. The upper limit of the carbon content is not particularly limited, and it may be 100 mass % or less or 99 mass % or less.

<Defect>

The carbon foam of the present embodiment may be a carbon foam formed of a single member without defect. The "defect" means a through hole that passes through the surface having an area of 150 cm$^2$ or more described above, penetrates the carbon foam, and has an area of 10 mm$^2$ or more on the surface. That is, the carbon foam of the present embodiment does not include any through hole having an area of 10 mm$^2$ or more on the surface. Note that the surface means a surface composed of a single face, and does not include a surface composed of a plurality of adjacent faces of a polyhedral surface, for example.

Figure 1B:
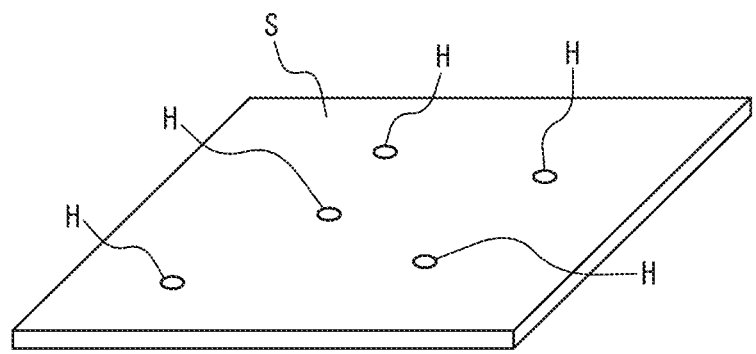
FIG. 1B illustrates another example of carbon foam included in the present embodiment.
Figure 1C:
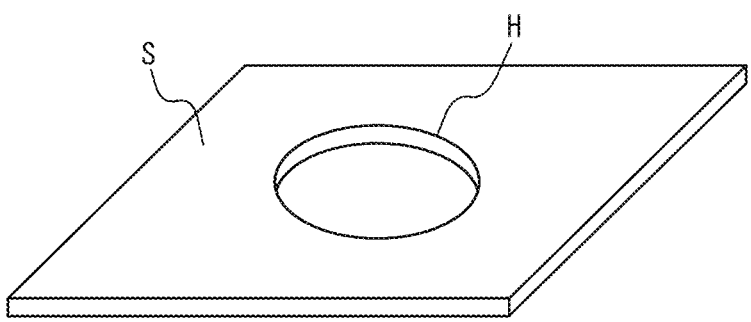
FIG. 1C illustrates an example of carbon foam not included in the present embodiment.

FIG. 1A illustrates an example of carbon foam included in the present embodiment. FIG. 1B illustrates another example of carbon foam included in the present embodiment. FIG. 1C illustrates an example of carbon foam not included in the present embodiment. The carbon foam illustrated in FIG. 1A has no through hole H and is a carbon foam without defect. For the carbon foam illustrated in FIG. 1B, although it has some through holes H, all the through holes having an area of less than 10 mm$^2$. When a carbon foam having through holes of such a small area is used as a battery electrode, the current flowing through the carbon foam only needs to make a small detour around the through holes, so that the influence on the conductivity is small. Therefore, the carbon foams illustrated in FIGS. 1A and 1B can be included in the present embodiment.

On the other hand, the carbon foam illustrated in FIG. 1C has one through hole H with an area of 10 mm$^2$ or more. In this case, when the carbon foam is used as a battery electrode, the current flowing through the carbon foam has to make a wide detour around the through hole, so that the resistance value is increased and the conductivity is deteriorated. Therefore, the carbon foam illustrated in FIG. 1C is not included in the present embodiment.

<Ratio of the Number of Linear Portions to the Number of Node Portions>

For the carbon foam of the present embodiment, the ratio of the number of linear portions to the number of node portions may be 1.4 or more and 1.55 or less. The ratio is, in other words, an average number of branches branching at a node portion. By setting the ratio to 1.4 or more, a structure where disjoined linear portions are in contact with each other such as nonwoven fabric, which is not a three-dimensional network structure where linear portions are joined by node portions, can be excluded from the carbon foam of the present embodiment. In addition, by setting the ratio to 1.55 or less, a porous structure covered with, for example, a honeycomb-like wall surface where linear portions are in a belt shape can be excluded from the carbon foam of the present embodiment. The ratio is preferably 1.42 or more and 1.53 or less, and more preferably 1.44 or more and 1.50 or less.

<Orientation Angle of Linear Portion>

For example, when a melamine resin foam is heat treated and carbonized in a heat treatment furnace, the obtained carbon foam has an isotropic structure where carbon fibers forming the skeleton of the carbon foam are evenly spread in all directions. For an average value of the orientation angles of the linear portions with respect to each of three mutually orthogonal directions in such a carbon foam, the difference θ between an average value of the orientation angles with respect to one direction and an average value of the orientation angles with respect to another direction is usually 1° or less.

However, if a compressive stress is applied to the melamine resin foam, which is a raw material of carbon foam, when the resin foam is being heat treated and carbonized, a carbon foam having a skeleton structure where carbon fibers spread anisotropically is obtained. Such a carbon foam is capable of suppressing breakage of carbon fibers (linear portions), reducing pulverization, and realizing high resilience even when a compressive load is applied thereon. To obtain this effect, the difference between the average values of the orientation angles in the carbon foam of the present embodiment may be 3° or more. The difference is preferably 5° or more and more preferably 8° or more. The three directions may be, for example, x, y, and z directions and may be arbitrarily set for the carbon foam.

<Porosity>

From the viewpoint of flexibility, the porosity of the carbon foam of the present embodiment may be 50% or more, preferably 60% or more, and even more preferably 70% or more. In addition, from the viewpoint of improving the surface area and reducing the cell resistance, the porosity of the carbon foam of the present embodiment may be 99% or less, preferably 98% or less, and more preferably 95% or less. In the present embodiment, the porosity is a value determined from bulk density and real density. The bulk density is a density based on the volume including the pores in the carbon foam. On the other hand, the real density is a density based on the volume occupied by the material of the carbon foam.

<Method of Measuring Fiber Diameter>

In the present specification, the fiber diameter of the carbon fibers forming the carbon foam is determined by image analysis of a scanning electron microscope (SEM) image. Specifically, the carbon foam is observed at a magnification of 10,000 using a scanning electron microscope. Assuming that the cross section is in a circular shape, the diameter of the carbon fiber is taken as the fiber diameter. The average fiber diameter is an average value of the fiber diameters measured as described above at any 20 locations.

<Method of Measuring Weight Per Unit Area>

In the present specification, the weight per unit area of the carbon foam is obtained by cutting out a carbon foam in a size of 3 cm×3 cm in a surface area of, for example, 150 cm$^2$ or more, measuring the weight of the carbon foam using a precision balance, and calculating a weight per 1 m×1 m from the measured weight.

<Method of Measuring of Density of Node Portion, the Number of Node Portions, the Number of Linear Portions, and Orientation Angle>

In the present specification, the density of the node portions, the number of the node portions, the number of the linear portions, and the orientation angle are obtained by imaging the carbon foam using an X-ray computerized tomography (CT) apparatus, subjecting the obtained tomogram data to median filter treatment as preprocessing, then using OTSU's binarization algorithm (see Nobuyuki OTSU, "Automatic Threshold Selection Method based on Discrimination and Least Squares Criterion", The IEICE Transactions D, Vol. J63-D, No. 4, pp. 346-356 (1980)) to divide the region into structure and space to obtain a three-dimensional image of a structure including the inside of the carbon foam, and using the obtained three-dimensional image and structural analysis software to determine the values.

Specifically, the number of the node portions and the number of the linear portions are determined by detecting the node portions and the linear portions included in the obtained three-dimensional image, and counting the numbers thereof. The density of the node portions is determined by counting the number of node portions per unit volume of 1 mm×1 mm×1 mm. The ratio of the number of linear portions to the number of node portions is determined based on the number of the node portions and the number of the linear portions counted as described above in the same carbon foam.

Further, the orientation angle θ of a linear portion is an angle between a straight line connecting the node portions at two ends of the linear portion and each direction, and is determined for each of the three mutually orthogonal directions in the three-dimensional image. The average value of the orientation angles of the linear portions for each direction is determined.

A CT apparatus with low-energy and high-brightness X-rays such as a high-resolution 3D X-ray microscope nano3DX manufactured by Rigaku Corporation may be used as the CT apparatus for carbon foam structural analysis. For the image processing and structural analysis, Centerline Editor of Simpleware software manufactured by JSOL Corporation, for example, may be used.

<Method of Measuring Surface Area>

In the present specification, the surface area of the carbon foam is obtained by measuring the dimensions of the surface using, for example, vernier calipers and determining the surface area from the obtain dimensions.

<Method of Measuring Functional Group Concentration>

In the present specification, the surface analysis of the carbon foam by X-ray photoelectron spectroscopy is performed as follows. The oxygen-containing functional group concentration on the surface of the carbon foam can be measured using an X-ray photoelectron spectrometer (PerkinElmer, ESCA-5500MT). The obtained C1s peak is fitted by four Gaussian distributions with joining energies of 284.4 eV (graphite), 285.6 eV (C—OH), 287.0 eV (C═O) and 288.6 eV (COOH) as peaks. The concentration of each surface functional group can be obtained by calculating the ratio of the area of each peak to the total area of the four peaks. In addition, the concentration of all surface functional groups can be determined from the ratio of the total area of the three peaks at the joining energies of 285.6 eV (C—OH), 287.0 eV (C═O) and 288.6 eV (COOH) to the total area of the four peaks.

<Method of Confirming Through Hole H>

In the present specification, the presence or absence of through hole is evaluated by visual inspection and inspection using an inspection device equipped with a light source and a photodetector (for example, a pinhole inspection machine). Specifically, the surface of the carbon foam is first visually observed to evaluate the presence or absence of through hole. When the presence of through hole cannot be visually confirmed, the inspection using an inspection device is performed. Specifically, a light source is arranged on the surface side of the carbon foam, and a photodetector is arranged on a surface side opposite to the surface S. Then, light is irradiated from the light source toward the surface S of the carbon foam. In the case where the carbon foam has a through hole, the irradiated light passes through the through hole H and reaches the photodetector. A through hole can be detected in this way. The arrangement of the light source and the photodetector may be reversed. An inspection device, such as a commercially available pinhole inspection machine, can detect pinholes with a diameter of several μm. Therefore, the inspection device can reliably detect a through hole with an area of 10 mm$^2$ or more, even the through hole is missed in the visual inspection.

When the inspection detects a through hole, the area of the through hole on the surface is measured. The area can be measured using a microscope or an electron microscope. In the present specification, a carbon foam in which the inspection using a light source and a photodetector described above detects no through hole, and a carbon foam in which all the detected through holes have an area of less than 10 mm$^2$, are regarded as carbon foams without defect. On the other hand, a carbon foam having a through hole with an area of 10 mm$^2$ or more is regarded as a defective carbon foam.

Note that the shape of the through hole is not limited, and a crack and a line are also included in the through hole. In addition, a carbon foam having a plurality of through holes on the surface of the carbon foam and all of which have an area of less than 10 mm² is regarded as a carbon foam without defect. On the other hand, a carbon foam having a plurality of through holes on the surface of the carbon foam and having at least one through hole with an area of 10 mm² or more is regarded as a defective carbon foam.

<Calculation of Porosity>

In the present specification, the porosity Vf,pore can be obtained from the bulk density ρbulk and the real density ρreal, which are determined as described below, using the following equation (1).

$$Vf\text{,pore}=((1/\rho\text{bulk})-(1/\rho\text{real}))/(1/\rho\text{bulk})\times 100(\%) \quad (1)$$

[Measurement of Bulk Density]

First, the dimensions of the carbon foam are measured using vernier calipers or the like, and the obtained dimensions are used to determine the bulk volume Vbulk of the carbon foam. Next, the mass M of the carbon foam is measured using a precision balance. With the obtained mass M and bulk volume Vbulk, the bulk density ρbulk of the carbon foam can be determined using the following equation (2).

$$\rho\text{bulk}=M/V\text{bulk} \quad (2)$$

[Measurement of Real Density]

The real density ρreal of the carbon foam can be determined with the sink-float method using a mixed solution of n-heptane, carbon tetrachloride and ethylene dibromide. Specifically, first, a carbon foam of an appropriate size is inserted into a stoppered test tube. Next, three solvents are appropriately mixed and added to the test tube, and the test tube is soaked in a thermostat bath at 30° C. If the specimen comes up, then the low-density n-heptane is added. On the other hand, if the specimen sinks down, then the high-density ethylene dibromide is added. This operation is repeated until the specimen floats in the liquid. Finally, the density of the liquid is measured using a Gay-Lussac pycnometer.

The carbon content of the carbon foam can be determined by X-ray fluorescence measurement. Specifically, the carbon content is measured with the method described in EXAMPLES section.

The carbon foam of the present disclosure is homogeneous overall as described above, and therefore it has better cell resistance than a heterogeneous carbon foam when used as an electrode of a battery, for example. In addition, it has better blocking performance and permeation performance than a heterogeneous carbon foam when used as a filter.

(Method of Manufacturing Carbon Foam)

The method of manufacturing the carbon foam of the present embodiment may include a raw material foam introduction process where a resin foam, which is a raw material of carbon foam, is introduced into a heat treatment furnace, a heating process where a temperature inside the heat treatment furnace is raised to a heat treatment temperature at a first heating rate, a carbonization process where the resin foam is held at the heat treatment temperature for a predetermined time and carbonized to obtain a carbon foam, a cooling process where the temperature inside the heat treatment furnace is lowered to room temperature, and a carbon foam removing process where the carbon foam is removed out of the heat treatment furnace. The heating process may be performed while decompressing and evacuating the inside of the heat treatment furnace at least in a first temperature range where the amount of decomposition gas generated from the resin foam is large.

FIG. 2 is a flow chart of the method of manufacturing the carbon foam of the present disclosure. First, in step S1, a resin foam, which is a raw material of carbon foam, is introduced into a heat treatment furnace (raw material foam introduction process).

The resin foam as a raw material of carbon foam may be any resin foam known as a raw material of carbon foam. For example, in the case where the resin foam as a raw material is a melamine resin foam, a melamine/formaldehyde condensation foam manufactured with the method described in JP H04-349178 A may be used as the melamine resin foam, for example. The resin foam is not limited to a melamine resin foam, and may be a urethane resin foam or a phenol resin foam.

According to the method, first, an aqueous solution or dispersion containing a melamine/formaldehyde precondensate, an emulsifier, a volatile foaming agent, a curing agent, and, if necessary, a well-known filler is subjected to foaming treatment and then curing treatment to obtain a melamine/formaldehyde condensation foam.

In this method, the melamine/formaldehyde precondensate may be one having a ratio of melamine:formaldehyde=1:1.5 to 1:4, and an average molecular weight of 200 to 1000, for example. In addition, examples of the emulsifier include 0.5 mass % to 5 mass % (based on the melamine/formaldehyde precondensate, the same applies to the following description) sodium salts of alkyl sulfonic acid and aryl sulfonic acid; examples of the volatile foaming agent include 1 mass % to 50 mass % pentane and hexane; and examples of the curing agent include 0.01 mass % to 20 mass % hydrochloric acid and sulfuric acid. In the foaming treatment and the curing treatment, the solution containing the above components may be heated to a temperature set in accordance with the type of the used volatile foaming agent and the like.

In addition, the heat treatment furnace for carbonizing the resin foam as a raw material is not limited as long as it is a furnace capable of carbonizing the resin foam to obtain a carbon foam. Examples thereof include a heat treatment furnace including a reaction furnace for holding a resin foam as a raw material, a heater for heating the inside of the reaction furnace, a gas introduction port for introducing inert gas into the reaction furnace, a gas discharge port for discharging gas out of the reaction furnace, and a vacuum pump for decompressing the inside of the reaction furnace and making it into a vacuum.

Next, in step S2, the temperature inside the heat treatment furnace is raised to a predetermined heat treatment temperature at a first heating rate (heating process). At that time, it is important to perform the process while decompressing and evacuating the inside of the heat treatment furnace in a first temperature range where the amount of decomposition gas generated from the resin foam is large.

As described above, when the resin foam as a raw material of carbon foam is heated, the active decomposition gas generated from the resin foam reacts with the carbon fibers forming the carbon foam and locally decomposes the carbon fibers, causing inhomogeneity in the carbon foam. The amount of the decomposition gas generated depends on the temperature inside the furnace. Therefore, in the present embodiment, the inside of the heat treatment furnace is decompressed and evacuated in a temperature range where the amount of decomposition gas generated from the resin foam is large (first temperature range) during the heating process. In this way, it is possible to promote the diffusion of the decomposition gas generated inside the resin foam to the outside of the resin foam to prevent the occurrence of inhomogeneity in the carbon foam.

In the present embodiment, the temperature range where the amount of decomposition gas generated from the resin foam is large (first temperature range) is a temperature range where the weight of the resin foam decreases by 5% or more of the initial weight per 100° C. when the weight of the resin foam as a raw material in the heating process is monitored in advance at intervals of 0° C. to 100° C. For example, in the case where the weight of the resin foam decreases by 5% or more of the initial weight per 100° C. in all temperature ranges of 300° C. or higher and lower than 400° C., 400° C. or higher and lower than 500° C., and 500° C. or higher and lower than 600° C., the first temperature range is 300° C. or higher and lower than 600° C.

As a result of our investigation, it has been understood that, in the case of using a melamine resin foam as the resin foam, the temperature range with a large amount of decomposition gas (first temperature range) is a temperature range of 200° C. or higher and lower than 800° C. Therefore, in the case of using a melamine resin foam as the resin foam, for example, the inside of the heat treatment furnace is decompressed and evacuated at least in the first temperature range.

The decompression and evacuation can be performed by an evacuation means such as a vacuum pump. However, the pump used should have at least an evacuation ability capable of reducing the pressure inside the furnace to 1 Pa or less within 10 minutes.

In the case where the resin foam as a raw material is a melamine resin foam, for example, the heating rate up to the heat treatment temperature (first heating rate) is preferably 10° C./min or lower from the viewpoint of suppressing the amount of decomposition gas generated. In addition, the first heating rate is preferably 1° C./min or higher from the viewpoint of overall productivity.

It is preferable to perform the heating process at a heating rate (second heating rate) lower than the heating rate up to the heat treatment temperature (first heating rate) in the temperature range where the amount of decomposition gas generated from the resin foam is large (first temperature range). In this way, it is possible to reduce the amount of decomposition gas generated inside the resin foam per unit time, and to further promote the diffusion of the decomposition gas to the outside of the foam structure. In the case where the heating rate is lowered (that is, the heating rate is changed to the second heating rate) in the first temperature range, the heating rate may return to the first heating rate after the temperature inside the furnace exceeds the upper limit of the first temperature range.

Further, it is preferable to perform the heating process at a heating rate (third heating rate) even lower than the second heating rate in a range where the increasing rate of the amount of decomposition gas generated is high (second temperature range) within the first temperature range where a large amount of decomposition gas is generated. In this way, it is possible to further reduce the amount of decomposition gas generated inside the resin foam per unit time, and to further promote the diffusion of the decomposition gas to the outside of the foam structure.

In the present embodiment, the temperature range where the increasing rate of the amount of decomposition gas generated from the resin foam is high (second temperature range) may be a temperature range where the weight of the resin foam decreases by 20% or more of the initial weight per 100° C. when the weight of the resin foam as a raw material in the heating process is monitored in advance at intervals of 0° C. to 100° C. For example, in the case where the weight of the resin foam decreases by 20% or more of the initial weight per 100° C. in both temperature ranges of 300° C. or higher and lower than 400° C. and 400° C. or higher and lower than 500° C., the second temperature range is 300° C. or higher and lower than 500° C.

In the case of where the resin foam as a raw material is a melamine resin foam, the temperature range where the amount of desorbed gas generated from the resin foam is large (first temperature range) is a temperature range of 200° C. or higher and lower than 800° C. as described above. In addition, as a result of our investigation, it has been understood that the temperature range where the increasing rate of the amount of desorbed gas generated from the resin foam is high (second temperature range) is a temperature range of 300° C. or higher and lower than 400° C. When the resin foam as a raw material is a melamine resin foam, the heating rate is more preferably 5° C./min or lower in the first temperature range, and particularly preferably 3° C./min or lower in the second temperature range.

Moreover, in the heating process and the carbonization process described later, the atmosphere inside the furnace may be made into an inert gas atmosphere or a vacuum to prevent the decomposition reaction between oxygen and the carbon fibers forming the carbon foam. The inside of the furnace being a vacuum herein indicates that the degree of vacuum inside the furnace is less than 1 Pa. In the case of an inert gas atmosphere, the inside of the furnace is decompressed and evacuated to release air containing oxygen after introducing the resin foam, which is a raw material of carbon foam, into the heat treatment furnace (raw material foam introduction process). After the inside of the furnace reaches a degree of vacuum of less than 1 Pa and is sufficiently evacuated, nitrogen gas is introduced. In this way, the inside of the furnace can be made into a nitrogen gas atmosphere. After the inside of the furnace is made into an inert gas atmosphere or a vacuum as described above, the heating starts, and the inside of the furnace is decompressed and evacuated in the first temperature range.

Furthermore, in the range of 200° C. or higher and lower than 800° C. where the amount of desorbed gas of the melamine resin foam is large (first temperature range), it is preferable to continue the decompression and evacuation while introducing inert gas into the furnace. The inert gas, such as nitrogen gas or argon gas, flows inside the furnace, thereby promoting the discharge of the decomposition gas generated inside the resin foam.

During the introduction of inert gas, the flow rate of the inert gas is preferably 1 L/min or more, more preferably 3 L/min or more, and particularly preferably 5 L/min or more. In addition, the flow rate of the inert gas is preferably 40 L/min or less, more preferably 30 L/min or less, and particularly preferably 20 L/min or less.

Subsequently, in step S3, the resin foam is held at the heat treatment temperature, which has been reached by raising the temperature, for a predetermined time and carbonized to obtain a carbon foam (carbonization process). In the present embodiment, the heat treatment temperature is a temperature equal to or higher than the softening point of the resin foam as a raw material. For example, when the resin foam is a melamine resin foam, since the softening point of the melamine resin foam is 300° C. to 400° C., the heat treatment temperature is a temperature equal to or higher than the softening point. The heat treatment temperature for the melamine resin foam is preferably 800° C. or higher, and more preferably 1000° C. or higher. In addition, from the viewpoint of physical fragility caused by high crystallinity, the heat treatment temperature for the melamine resin foam is preferably 3000° C. or lower, and more preferably 2500° C. or lower.

The time for holding the resin foam at the heat treatment temperature (heat treatment time) may be a time during which the resin foam as a raw material is completely carbonized. For example, when the resin foam as a raw material is a melamine resin foam, the holding time is 0.5 hours or longer. The time for holding the melamine resin foam is preferably 1 hour or longer, and more preferably 2 hours or longer. In addition, from the viewpoint of productivity, the time for holding the melamine resin foam is preferably 5 hours or shorter, and more preferably 4 hours or shorter.

Next, in step S4, the temperature inside the heat treatment furnace is lowered to room temperature (cooling process). From the viewpoint of mitigating the damage to the heaters and insulation inside the furnace caused by rapid cooling, the cooling rate from the carbonization temperature of the melamine resin foam is preferably 20° C./min or lower. The cooling rate for the melamine resin foam is more preferably 15° C./min or lower. In addition, from the viewpoint of overall productivity, the cooling rate for the melamine resin foam is preferably 5° C./min or higher. The cooling rate for the melamine resin foam is more preferably 10° C./min or higher.

Finally, in step S5, the carbon foam is removed out of the heat treatment furnace (carbon foam removing process). The carbon foam of the present disclosure can be manufactured in this way.

The heating process and the carbonization process can be performed while applying a compressive load to the resin foam as a raw material, thereby obtaining a carbon foam having a skeleton structure in which carbon fibers spread anisotropically. As described above, a carbon foam with anisotropy is capable of suppressing breakage of carbon fibers, reducing pulverization, and realizing high resilience even when a compressive load is applied thereon.

The compressive load can be applied by placing a weight such as a graphite plate on the resin foam as a raw material. The applied compressive load is preferably 50 Pa or more, and more preferably 200 Pa or more. In addition, the applied compressive load is preferably 2000 Pa or less and more preferably 1500 Pa or less.

In the case where compression is performed using, for example, a vacuum press device, the compression may be controlled by a compression ratio, which is obtained by determining a membrane thickness after pressing by a spacer and dividing the original thickness by the thickness of the spacer, rather than being controlled by a press load. In this case, the compression ratio is preferably 4 times or more and more preferably 10 times or more from the viewpoint of obtaining anisotropy. In addition, the compression ratio is preferably 100 times or less and more preferably 50 times or less from the viewpoint of maintaining a three-dimensional structure. The vacuum press device is not particularly limited as long as it is a device that can discharge active gas and can heat and compress a resin foam or a device that can compress a laminate of carbon foam. For example, a heat treatment furnace, which is equipped with a top plate for pressing a resin foam, a heater for heating the top plate, a gas discharge port for discharging gas out of the inside of the device, and a vacuum pump for decompressing the inside of the device and making it into a vacuum, may be used.

When a compressive load is applied to the resin foam as a raw material, the diffusion of the decomposition gas is suppressed by the weight such as a graphite plate. Therefore, during the heating process, it is particularly preferable to reduce the heating rate as compared with the case where no compressive load is applied, and continue the decompression and evacuation while supplying inert gas into the furnace, thereby promoting the discharge of the decomposable gas.

For example, when the resin foam as a raw material is a melamine resin foam, it is preferable to set the heating rate to 5° C./min or lower in the temperature range of 200° C. or higher and lower than 800° C. (first temperature range), and more preferable to set the heating rate to 2° C./min or lower in the temperature range of 300° C. or higher and lower than 400° C. where the increasing rate of the amount of desorbed gas generated is high (second temperature range). Further, it is preferable to supply inert gas such as nitrogen gas or argon gas into the heat treatment furnace in the temperature range of 200° C. or higher and lower than 800° C. (first temperature range).

The compressive stress on the resin foam as a raw material may be applied not only in one direction, and it may be applied in two directions.

Second Embodiment of the Present Disclosure

The membrane electrode assembly of the present embodiment can be suitably used for, for example, a redox flow battery, a water splitting device with a solid polymer membrane, a direct methanol fuel cell, and a fuel cell.

Among the above, the membrane electrode assembly is suitable for a redox flow battery from the viewpoint of the flexibility, high surface area, and three-dimensionally continuous structure of the carbon foam of the first embodiment described above.

(Redox Flow Battery)

Figure 3:
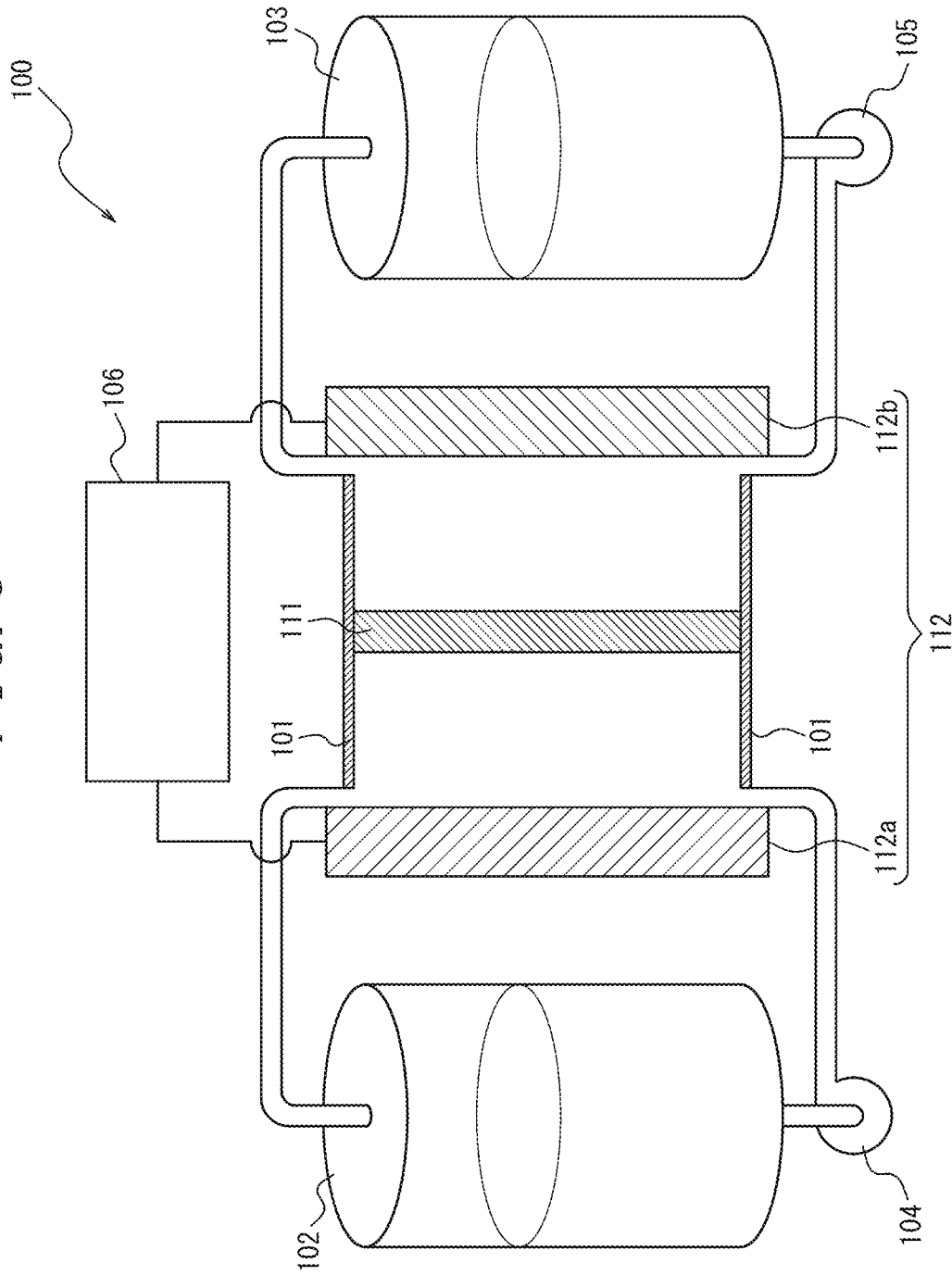
FIG. 3 schematically illustrates a common structure of a redox flow battery.

As illustrated in FIG. 3, a common redox flow battery 100 includes an electrolytic bath 101, tanks 102 and 103 for storing an electrolytic solution, and pumps 104 and 105 for circulating the electrolytic solution between the tanks and the electrolytic bath. The electrolytic bath 101 has electrodes 112 composed of a positive electrode 112a and a negative electrode 112b which are separated by an ion exchange membrane 111. The electrolytic bath 101 is connected to a power source 106.

In the redox flow battery 100, charge and discharge are performed by converting electrochemical energy on the electrodes 112 of the electrolytic bath 101 while circulating the electrolytic solution between the tanks 102 and 103 and the electrolytic bath 101 by the pumps 104 and 105.

Figure 4A:
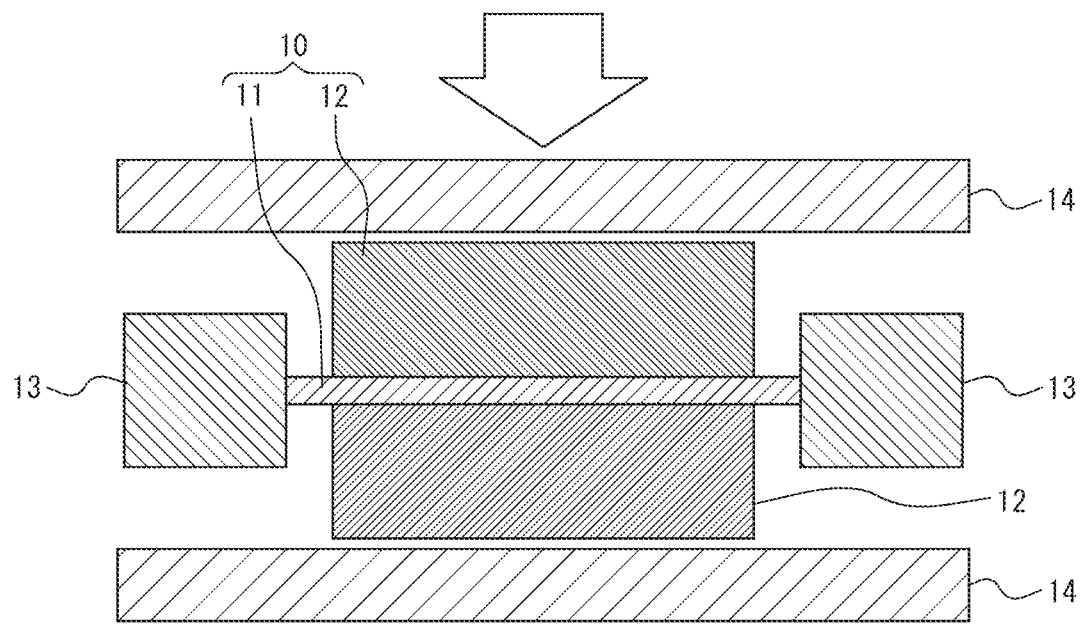
FIG. 4A is a first schematic diagram of a common structure of the cell in FIG. 3.

In the redox flow battery 100, the ion exchange membrane 111 and the electrodes 112 are separated. In order to increase the current density per unit area of an electrode, a battery is often obtained by, as illustrated in FIG. 4A, joining an ion exchange membrane 11 and electrodes 12 to form a membrane electrode assembly 10, sandwiching the membrane electrode assembly 10 between current collectors 14 via a separator 13 to form a cell 20 as illustrated in FIG. 4B, and providing a plurality of such cells 20 to constitute a battery.

Figure 4B:
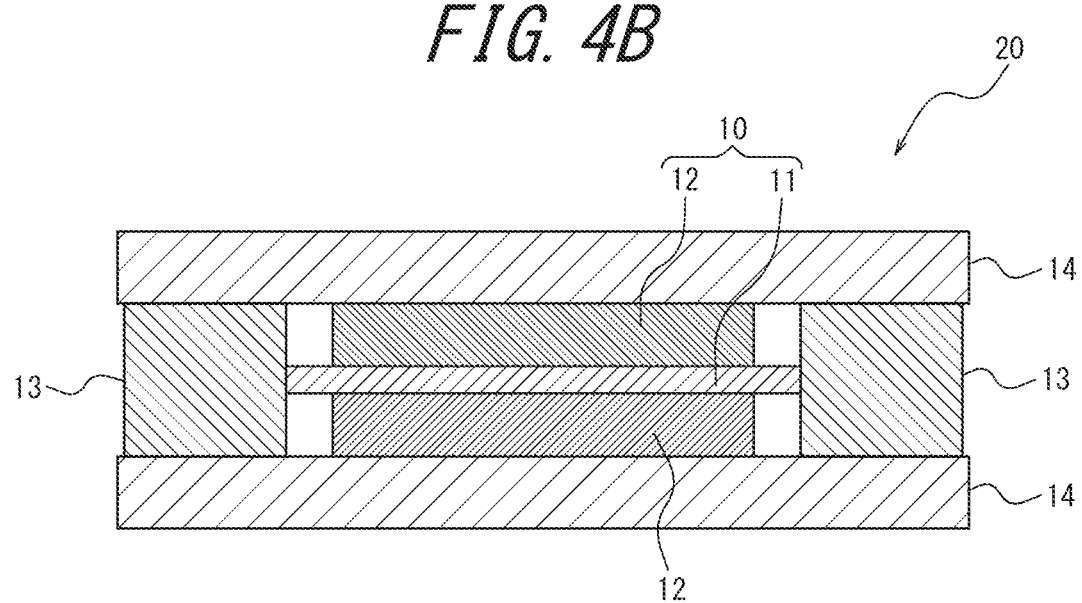
FIG. 4B is a second schematic diagram of a common structure of the cell in FIG. 3.

The cell 20 illustrated in FIG. 4B uses the carbon foam of the first embodiment described above as the electrode 12 in the present embodiment because it is necessary to guarantee conductivity, electrochemical stability and electrolytic solution flowability.

(Membrane Electrode Assembly)

Figure 5:
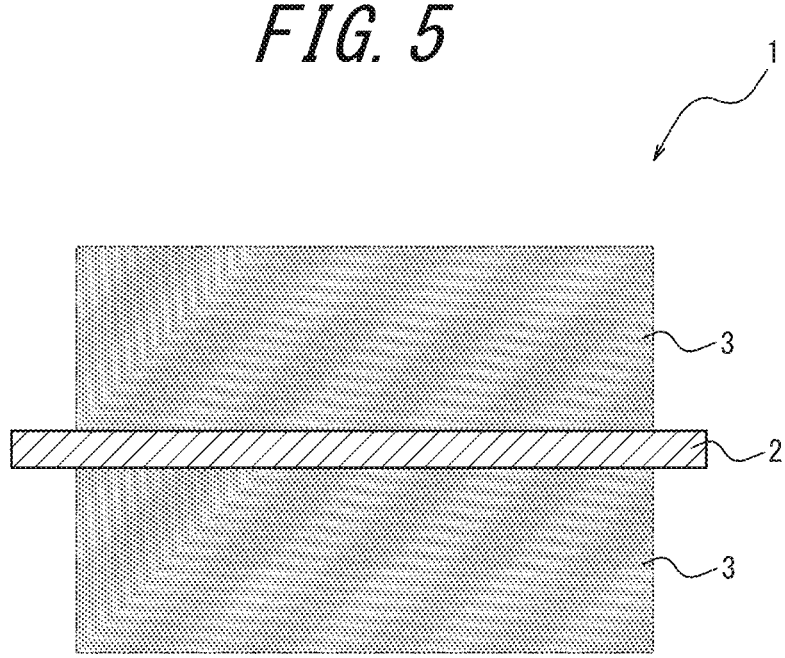
FIG. 5 illustrates the membrane electrode assembly of the present embodiment.

As illustrated in FIG. 5, the membrane electrode assembly 1 of the present embodiment is an assembly in which at least a part of a homogeneous carbon foam 3 is adhered to at least one surface of an ion exchange membrane 2 having a first surface and a second surface.

Being an assembly of a homogeneous carbon foam and an ion exchange membrane can guarantee sufficient contact between electrodes and current collectors when a cell of a redox flow battery is formed, thereby obtaining a battery with low cell resistance and good performance. It is acceptable that the homogeneous carbon foam is on at least one surface of the ion exchange membrane described above, and it is more preferable to adhere the homogeneous carbon foam to the first surface and the second surface.

When assembling the cell of a redox flow battery, a good alignment between the ion exchange membrane and the carbon foam as the electrode is preferably an assembly in which the homogeneous carbon foam and the ion exchange membrane are at least partially adhered, from the viewpoint of contribution to suppressing leakage of electrolytic solution from the cell. In addition, from the viewpoint of good long-term durability of the redox flow battery, it is preferable to adhere 30% or more of the surface of the carbon foam to the ion exchange membrane, and 50% or more is more preferable and 80% or more is further preferable.

For the membrane electrode assembly of the present embodiment, it is preferable to adhere two or more pieces of the homogeneous carbon foam to at least one surface of the ion exchange membrane having a first surface and a second surface. For a common redox flow battery, for example, charge and discharge as a battery are performed when a reaction such as oxidation-reduction reaction proceeds in a process where active materials pass through a porous carbon electrode and are discharged to the outside of the electrode. Therefore, the viscosity of the electrolytic solution and the concentration of unreacted active materials differ between an inlet side and an outlet side of the electrode, and the properties such as porosity, surface area, and surface activity required for the electrode change depending on the position of the electrode. However, it is not easy to make a difference in density in a single porous electrode, and it is even more difficult to partially change the surface properties. In fact, the above-mentioned PTLS 1 to 5 only describe carbon foams and porous carbon electrodes having a uniform density and uniform surface properties. Because of this background, it is preferable to arrange a plurality of porous carbon electrodes in one same plane.

Further, it is preferable to arrange carbon foams having different properties as the plurality of porous carbon electrodes arranged in one same plane. Specifically, it is preferable to use carbon foams having different porosities from the viewpoint that reducing the pressure loss of the redox flow battery can improve the energy efficiency. In addition, it is preferable to use carbon foams having different surface activities from the viewpoint that reducing the reaction resistance of the battery can improve the energy efficiency.

The void between the plurality of carbon foams adhered in one same plane is not particularly limited. However, from the viewpoint of reducing the cell resistance and obtaining good energy efficiency, it is preferably 10 mm or less, more preferably 5 mm or less, further preferably 3 mm or less, and even more preferably 1 mm or less. Note that the void between the carbon foams includes a strip-shaped void sandwiched between linear ends of carbon foams facing each other when viewed from the normal direction of the plane to which the carbon foams are adhered, in other words, the void between the carbon foams include a void where the distance between the facing surfaces of two pieces of carbon foam is constant. In addition, the void between the carbon foams also includes space surrounded by curved edges of the carbon foams and in which no electrode exists when viewed from the normal direction, in other words, the void between the carbon foams also include space where the distance between the facing surfaces of two pieces of carbon foam varies. The space where the distance between the facing surfaces varies is, for example, space where one facing surface is a flat surface and the other facing surface is surrounded by a curved surface. The space where the distance between the facing surfaces, which comprise flat surfaces between which there is no distance for a part of the space and curved surfaces recessed to the flat surfaces for another part of the space, varies also includes space which is created between curved surfaces with flat surfaces joined together. In the case of the strip-shaped voids when viewed from the normal direction, the width between the straight lines is defined as the void between the carbon foams. In the case of the space in which no electrode exists when viewed from the normal direction, the farthest distance between the curves is defined as the void between the carbon foams.

The ratio of the void between the plurality of carbon foams adhered in one same plane is not particularly limited. However, from the viewpoint that reducing the cell resistance can improve the energy efficiency, it is preferably 5% or less, more preferably 3% or less, and further preferably 1% or less. This ratio indicates a ratio of the void between the carbon foams described above to the length of sheet size of one piece of the carbon foam electrodes in one same plane.

For the membrane electrode assembly of the present embodiment, the embedding depth of the carbon foam fibers in the ion exchange membrane is preferably 5 μm or less, more preferably 4 μm or less, further preferably 3 μm or less, and even more preferably 2 μm or less, from the viewpoint that the adhesion between the carbon foam and the ion exchange membrane can improve the energy efficiency. The embedding depth of the carbon foam can be evaluated from a SEM (Scanning Electron Microscope) image in which a cross section of the assembly cut parallel to the membrane thickness direction is magnified 2000 times, at any location where the carbon foam and the ion exchange membrane of the membrane electrode assembly are adhered.

The membrane electrode assembly can be manufactured, for example, by adhering the materials together with a hot press method. According to the hot press method, first, the ion exchange membrane and the carbon foams are laminated and placed between pressure plates of a hot press machine together with a spacer of a desired thickness. Next, the pressure plates are heated to a predetermined temperature, and then pressing is performed. After holding for a predetermined time, the pressure plates are released, and a membrane electrode assembly is taken out and cooled to room temperature to obtain a membrane electrode assembly.

From the viewpoint that controlling the embedding depth of the carbon foam can suppress the deterioration of the ion exchange membrane, the heating temperature in the hot press method is preferably the glass transition temperature of the ion exchange membrane+50° C. or lower. The thickness of the spacer is preferably 30% or more and 90% or less, and more preferably 50% or more and 80% or less with respect to the total thickness of the carbon foam and the ion exchange membrane used. The holding time during the pressing is preferably 0.5 minutes or longer and 30 minutes or shorter, and more preferably 2 minutes or longer and 10 minutes or shorter.

The ion exchange membrane used in the present embodiment is preferably a membrane having a structure that allows a target ion to permeate, and examples thereof include a perfluorocarbon polymer having an ion exchange group and a hydrocarbon membrane having an ion exchange group. The ion exchange group is not particularly limited, and examples thereof include a —COOH group, a —SO$_3$H group, a —PO$_3$H$_2$ group, and salts thereof. The salt is not particularly limited, and examples thereof include alkali metal salts, alkaline earth metal salts, and amine salts. Examples of the resin include a perfluorocarbon polymer and a hydrocarbon membrane, and a perfluorocarbon polymer is preferable from the viewpoint of good long-term durability.

(Equivalent Weight EW)

From the viewpoint that suppression of the permeation of active material ions improves the current efficiency and from the viewpoint that improvement of the proton conductivity reduces the resistance, the ion exchange membrane has an equivalent weight EW of the ion exchange group of 600 g/eq or more and 2000 g/eq or less.

From the viewpoint that suppression of the permeation of active material ions improves the current efficiency, the equivalent weight EW of the ion exchange membrane used in the present embodiment is 600 g/eq or more, preferably 700 g/eq or more, more preferably 800 g/eq or more, and further preferably 900 g/eq or more. In addition, from the viewpoint that improvement of the proton conductivity reduces the resistance, the equivalent weight EW of the ion exchange membrane is 2000 g/eq or less, preferably 1700 g/eq or less, more preferably 1500 g/eq or less, and further preferably 1200 g/eq or less.

The equivalent weight EW means a dry mass (g) of the ion exchange membrane per equivalent of the ion exchange group. The equivalent weight EW of the ion exchange membrane can be measured by substituting the ion exchange membrane with a salt and back titrating the solution with an alkaline solution. The equivalent weight EW can be adjusted by the copolymerization ratio of the monomer which is a raw material of the ion exchange membrane, the selection of the monomer type, and the like.

(Membrane Thickness)

The membrane thickness of the ion exchange membrane used in the present embodiment is preferably 1 μm or more, more preferably 5 μm or more, further preferably 10 μm or more, and even more preferably 12 μm or more, from the viewpoint of good shielding of active materials when used as a battery. In addition, the membrane thickness of the ion exchange membrane is preferably 100 μm or less, more preferably 60 μm or less, further preferably 30 μm or less, and even more preferably 25 μm or less, from the viewpoint of improving the battery performance by reducing the resistance.

In order to uniform the overall performance of the membrane electrode assembly and from the viewpoint that the reduction of the thickness unevenness of the ion exchange membrane can improve the overall contact between the electrodes of the membrane electrode assembly and the current collectors, the membrane thickness uniformity of the ion exchange membrane used in the present embodiment is preferably within ±20% of the average membrane thickness, more preferably within ±15% of the average membrane thickness, and even more preferably within ±10% of the average membrane thickness.

The membrane thickness uniformity of the ion exchange membrane can be evaluated by allowing the ion exchange membrane to stand in a thermostatic chamber at a temperature of 23° C. and a relative humidity of 65% for 12 hours or longer, and then measuring the membrane thickness at any 20 locations using a contact-type thickness meter (for example, one manufactured by Toyo Seiki Seisaku-sho, Ltd.).

EXAMPLES

The following provides a description of specific examples and comparative examples. However, the present disclosure is not limited to these examples.

<Preparation of Carbon Form>

Example 1

First, a melamine resin foam (dimensions: 400 mm×400 mm×40 mm) was prepared as a material of carbon foam, and the melamine resin foam was introduced into a heat treatment furnace. Next, the inside of the furnace was decompressed and evacuated by a vacuum pump until the degree of vacuum inside the furnace was less than 1 Pa. Subsequently, nitrogen gas was supplied into the furnace at a flow rate of 2 L/min and the inside of the furnace was decompressed and evacuated. At the same time, the temperature inside the furnace was raised to 800° C. at a heating rate of 5° C./min. The degree of decompression inside the furnace was about 700 Pa when the temperature inside the furnace reached 800° C. The supply of nitrogen gas was stopped once the temperature inside the furnace reached 800° C., and the temperature was raised to a heat treatment temperature of 2000° C. at a heating rate of 5° C./min and kept at 2000° C. for 2 hours to carbonize the melamine resin foam. The degree of decompression inside the furnace was less than 10 Pa when the temperature inside the furnace reached 2000° C. Subsequently, the temperature inside the furnace was lowered to room temperature, then the vacuum pump was stopped, and the carbonized melamine resin foam was taken out from the furnace. The surface area of the obtained carbon foam is listed in Table 1. Subsequently, the obtained carbon foam was subjected to heat treatment at 600° C. for 1 hour under a dry air stream to obtain a carbon foam whose surface had been oxidized. The surface area of the oxidized carbon foam did not change after the carbonization. The dry air flow rate was 1 L/min. A carbon foam of Example 1 was prepared in this way. Details of the obtained carbon foam are listed in Table 1. Note that the measured fiber diameter was within ±20% of the average fiber diameter of all fibers.

TABLE 1

| | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| Ratio R ($N_1/N_n$) | 1.45 | 1.46 | 1.47 | 1.45 | 1.45 | 1.45 | 1.47 | 1.47 | 1.45 | 1.45 |
| Density of node portion (/mm$^3$) | 19,452 | 62,375 | 563,012 | 19,558 | 19,691 | 19,724 | 563,012 | 563,012 | 19,652 | 19,652 |
| Average value of orientation angle in x direction (°) | 58.0 | 60.5 | 62.0 | 58.2 | 58.0 | 58.0 | 62.1 | 62.0 | 58.0 | 58.0 |
| Average value of orientation angle in y direction (°) | 57.8 | 56.7 | 55.3 | 57.9 | 57.7 | 57.8 | 55.4 | 55.8 | 57.9 | 57.9 |

TABLE 1-continued

| | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|
| Average value of orientation angle in z direction (°) | 57.6 | 55.3 | 56.3 | 57.5 | 57.7 | 57.4 | 56.2 | 56.4 | 57.6 | 57.6 |
| Minimum value of $\theta_d$ (°) | 0.2 | 3.8 | 5. | 0.3 | 0.3 | 0.2 | 5.9 | 5.8 | 0.1 | 0.1 |
| Average fiber diameter of carbon fiber (μm) | 2.1 | 2.0 | 2.3 | 2.1 | 1.9 | 2.0 | 2.0 | 1.9 | 1.6 | 1.6 |
| Maximum or minimum fiber diameter (μm) | 2.2 (maximum) | 2.1 (maximum) | 2.2 (minimum) | 2.0 (minimum) | 2.0 (maximum) | 1.9 (minimum) | 2.2 (minimum) | 2.1 (minimum) | 0.7 (minimum) | 0.3 (minimum) |
| Weight per unit area (g/m$^2$) | 48 | 49 | 12 | 48 | 48 | 47 | 12 | 12 | 33 | 28 |
| Maximum or minimum weight per unit area (g/m$^2$) | 53 (maximum) | 55 (maximum) | 11 (maximum) | 44 (minimum) | 43 (minimum) | 53 (maximum) | 11 (minimum) | 11 (minimum) | 12 (minimum) | 7 (minimum) |
| Bulk density (kgm$^{-3}$) | 6.0 | 27.0 | 43.0 | 6.0 | 6.0 | 6.0 | 43.5 | 48.0 | 4.9 | 4.4 |
| Carbon content (mass %) | 99 | 99 | 99 | 99 | 99 | 99 | 99 | 1 | 99 | 98 |
| Carbon foam surface area (cm$^2$) | 484 | 484 | 484 | 484 | 484 | 484 | 484 | 484 | 395 | 395 |
| Resistance (Ω) | 7.88 | 5.00 | 15.60 | 7.69 | 8.01 | 7.79 | 13.81 | 14.52 | 35.33 | 42.60 |
| Oxygen atom concentration (mass %) | 0.55 | 0.48 | 0.61 | 0.57 | 0.56 | 0.63 | 0.05 | 1.67 | 0.65 | 0.98 |
| Graphite concentration after oxidation (at %) | 78.3 | 77.5 | 77.9 | 77.7 | 78.5 | 78.1 | 93.8 | 79.8 | 82.5 | 76.1 |
| C—OH concentration after oxidation (at %) | 9.7 | 9.8 | 10.1 | 10.5 | 9.9 | 10.1 | 2.5 | 9.8 | 8.5 | 10.6 |
| C=O concentration after oxidation (at %) | 10.2 | 10.5 | 9.8 | 10.2 | 9.5 | 9.8 | 1.8 | 9.1 | 8.8 | 10.5 |
| COOH concentration after oxidation (at %) | 1.8 | 2.2 | 2.2 | 1.6 | 2.1 | 2.0 | 1.9 | 1.3 | 0.2 | 2.8 |
| Oxygen-containing functional group concentration after oxidation (at %) | 21.7 | 22.5 | 22.1 | 22.3 | 21.5 | 21.9 | 6.2 | 20.2 | 17.5 | 23.9 |
| Cell resistance (Ω cm$^2$) | 1.87 | 1.25 | 0.87 | 1.91 | 1.99 | 1.89 | 1.05 | 0.90 | 2.67 | 2.91 |
| Wettability | Good | Good | Good | Good | Good | Good | Poor | Good | Fair | Good |

Example 2

A carbon foam of Example 2 was prepared as in Example 1. However, a graphite plate (dimensions: 400 mm×400 mm×4 mm, manufactured by BASF, product name "BASOTECT W") was placed on the melamine resin foam, and the melamine resin foam was introduced into the heat treatment furnace with a compressive load of 70 Pa applied thereon. In addition, the heating rate was 2.5° C./min in the temperature range of 300° C. or higher and lower than 400° C. (second temperature range). The other conditions were the same as in Example 1. Details of the obtained carbon foam are listed in Table 1. Note that the measured fiber diameter was within ±20% of the average fiber diameter of all fibers. The surface area of the oxidized carbon foam did not change after the carbonization.

Example 3

A carbon foam of Example 3 was prepared as in Example 2. However, the dimensions of the melamine resin foam were 400 mm×400 mm×10 mm, a graphite plate (dimensions: 400 mm×400 mm×16 mm) was placed on the melamine resin foam, and the melamine resin foam was introduced into the heat treatment furnace with a compressive load of 280 Pa applied thereon. The other conditions were the same as in Example 2. Details of the obtained carbon foam are listed in Table 1. Note that the measured fiber diameter was within ±20% of the average fiber diameter of all fibers. The surface area of the oxidized carbon foam did not change after the carbonization.

Example 4

A carbon foam of Example 4 was prepared as in Example 1. However, nitrogen gas was not supplied into the furnace. The other conditions were the same as in Example 1. Details of the obtained carbon foam are listed in Table 1. Note that the measured fiber diameter was within ±20% of the average fiber diameter of all fibers. The surface area of the oxidized carbon foam did not change after the carbonization.

Example 5

A carbon foam of Example 5 was prepared as in Example 4. However, the heating rate was 3° C./min in the temperature range of 200° C. or higher and lower than 800° C. (first temperature range). The other conditions were the same as in Example 4. Details of the obtained carbon foam are listed in Table 1. Note that the measured fiber diameter was within ±20% of the average fiber diameter of all fibers. The surface area of the oxidized carbon foam did not change after the carbonization.

Example 6

A carbon foam of Example 6 was prepared as in Example 5. However, the heating rate was 1° C./min in the temperature range of 300° C. or higher and lower than 400° C. (second temperature range). The other conditions were the same as in Example 5. Details of the obtained carbon foam are listed in Table 1. Note that the measured fiber diameter was within ±20% of the average fiber diameter of all fibers. The surface area of the oxidized carbon foam did not change after the carbonization.

Example 7

A carbon foam of Example 7 was prepared as in Example 3. However, the oxidation under a dry air stream was not performed after the carbonization. The other conditions were the same as in Example 3. Details of the obtained carbon foam are listed in Table 1. Note that the measured fiber diameter was within ±20% of the average fiber diameter of all fibers.

Example 8

A carbon foam of Example 8 was prepared as in Example 3. However, during the carbonization, the supply of nitrogen gas was stopped once the temperature reached 800° C., and the temperature was raised to a heat treatment temperature of 1100° C. at a heating rate of 5° C./min and kept at 1100° C. for 1 hour to carbonize the melamine resin foam. The degree of decompression inside the furnace was less than 10 Pa when the temperature inside the furnace reached 1100° C. In addition, the oxidation under a dry air stream was not performed after the carbonization. The other conditions were the same as in Example 3. Details of the obtained carbon foam are listed in Table 1. Note that the measured fiber diameter was within ±20% of the average fiber diameter of all fibers.

Comparative Example 1

Figure 6:
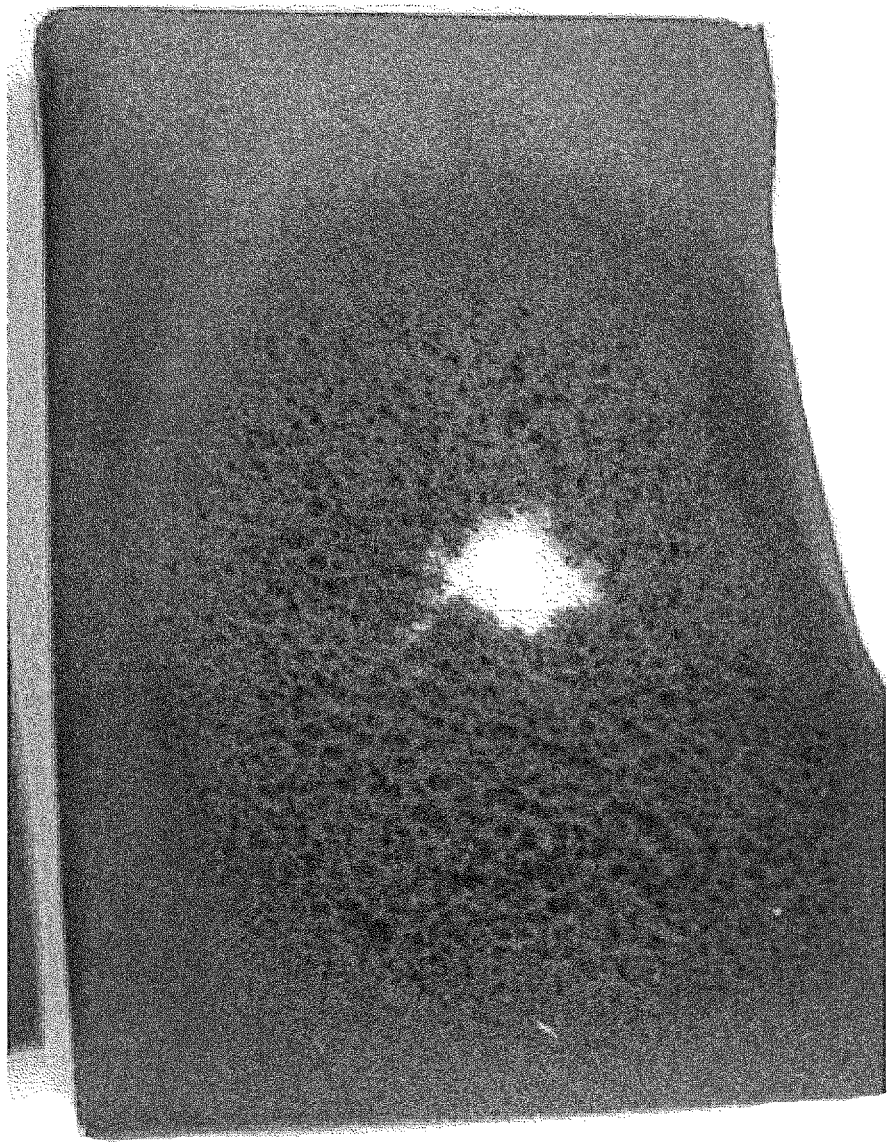
FIG. 6 is an external view of the carbon foam of Comparative Example 1.

A carbon foam of Comparative Example 1 was prepared as in Example 1. However, nitrogen gas was supplied (flow rate: 2 L/min) without performing decompression or evacuation, and gas was discharged out of the furnace by natural discharge. In addition, the oxidation under a dry air stream was not performed. The other conditions were the same as in Example 1. Note that under these conditions, the inside of the furnace was in a pressure environment equal to or higher than atmospheric pressure. As illustrated in FIG. 6, a central portion of the obtained carbon foam disappeared. In addition, the diameter of 50% of the fibers was less than 80% of the average fiber diameter. Details of the obtained carbon foam are listed in Table 1.

Comparative Example 2

A carbon foam was prepared in the same manner as in Comparative Example 1. Subsequently, the carbon foam was subjected to heat treatment at 600° C. for 1 hour under a dry air stream to obtain a carbon foam whose surface had been oxidized. The dry air flow rate was 1 L/min. In the obtained carbon foam, disappeared portion was increased as compared with that before the oxidation treatment. In addition, the surface of the disappeared portion was deteriorated, rendering it brittle. Details of the obtained carbon foam are listed in Table 1. Note that the sheet area was further reduced to 347 cm$^2$ after the oxidation treatment.

Example 9

A melamine resin foam (dimensions: 400 mm×400 mm×20 mm) was prepared as a material of carbon foam, a SUS plate having a thickness of 0.6 mm was placed around the sample as a spacer, and the melamine resin foam was sandwiched between graphite plates having a thickness of 10 mm from above and below and introduced into a vacuum hot press machine (KVHC-II) manufactured by KITAGAWA SEIKI CO., LTD. Next, decompression and evacuation were performed by a vacuum pump, and the temperature inside the press machine was raised to 360° C. at a heating rate of 5° C./min. The temperature was kept at 360° C. for 5 minutes. Pressing was performed at a pressure of 3.0 MPa when the temperature was being raised and kept at 360° C. Subsequently, the vacuum pump was stopped and the pressing was over after the temperature inside the machine was lowered to 50° C.

Next, the obtained sample was charged into a heat treatment furnace, and the melamine resin foam was carbonized under the same heating conditions as in Example 2. The surface area of the obtained carbon foam is listed in Table 2. Subsequently, the obtained carbon foam was subjected to heat treatment at 600° C. for 1.5 hours under a dry air stream to obtain a carbon foam whose surface had been oxidized. Details of the obtained carbon foam are listed in Table 2. Another sample was prepared under the same conditions. Note that for both carbon foams, the measured fiber diameter was within ±20% of the average fiber diameter of all fibers. The dimensions of the obtained carbon foam were 220 mm×220 mm×0.3 mm. The surface area of the oxidized carbon foam did not change after the carbonization.

| | Example 9 | Example 10 | Example 11 | Example 12 | Example 13 | Example 14 |
|---|---|---|---|---|---|---|
| Ratio R ($N_l/N_n$) | 1.50 | 1.51 | 1,51 | 1.51 | 1.51 | 1.51 |
| Density of node portion (/mm$^3$) | $2.0 \times 10^6$ | $2.1 \times 10^6$ | $2.1 \times 10^6$ | $2.1 \times 10^6$ | $2.1 \times 10^6$ | $2.1 \times 10^6$ |
| Average value of orientation angle in x direction (°) | 66.5 | 66.3 | 66.3 | 66.3 | 66.3 | 66.3 |
| Average value of orientation angle in y direction (°) | 50.5 | 50.7 | 50.7 | 50.7 | 50.7 | 50.7 |
| Average value of orientation angle in z direction (°) | 54.5 | 54.1 | 54.1 | 54.1 | 54.1 | 54.1 |
| Minimum value of $\theta_d$ (°) | 12 | 11.6 | 11.6 | 11.6 | 11.6 | 11.6 |
| Average fiber diameter of carbon fiber (μm) | 1.8 | 1.7 | 1.7 | 1.7 | 1.7 | 1.7 |
| Maximum or minimum fiber diameter (μm) | 2.1 (maximum) | 2.0 (maximum) | 2.0 (maximum) | 2.0 (maximum) | 2.0 (maximum) | 2.0 (maximum) |
| Bulk density (kgm$^{-3}$) | 140 | 130 | 130 | 130 | 130 | 130 |
| Carbon foam surface area (cm$^2$) | 484 | 484 | 484 | 484 | 484 | 484 |
| Carbon content (mass %) | 99 | 99 | 99 | 99 | 99 | 99 |
| Oxygen atom concentration (mass %) | 0.42 | 0.73 | 0.73 | 0.73 | 0.73 | 0.73 |
| Graphite concentration after oxidation (at %) | 77.4 | 76.5 | 76.5 | 76.5 | 76.5 | 76.5 |
| C—OH concentration after oxidation (at %) | 9.9 | 10.6 | 10.6 | 10.6 | 10.6 | 10.6 |

-continued

|  |  |  |  |  |  |  |
|---|---|---|---|---|---|---|
| C=O concentration after oxidation (at %) | 10.4 | 10.1 | 10.1 | 10.1 | 10.1 | 10.1 |
| COOH concentration after oxidation (at %) | 2.3 | 2.8 | 2.8 | 2.8 | 2.8 | 2.8 |
| Oxygen-containing functional group concentration after oxidation (at %) | 22.6 | 23.5 | 23.5 | 23.5 | 23.5 | 23.5 |
| Void between electrodes (mm) | — | 0 | 0 | 1 | 4 | 0 |
| Void between electrodes (%) | — | 0 | 0 | 0.7 | 2.7 | 0 |
| Embedding depth (μm) | 0 | 0 | 0 | 0 | 0 | 6 |
| Adhesive area (%) | 100 | 100 | 100 | 100 | 100 | 100 |
| Current efficiency at 10 cycles (CE %) | 94.8 | 96.7 | 96.2 | 96.2 | 96.6 | 97.1 |
| Voltage efficiency at 10 cycles (VE %) | 96.1 | 94.9 | 94.7 | 95.0 | 92.4 | 92.1 |
| Energy efficiency at 10 cycles (EE %) | 91.1 | 91.8 | 91.1 | 91.4 | 89.2 | 89.5 |
| Battery leakage | Good | Good | Good | Good | Good | Good |
| Wettability | Good | Good | Good | Good | Good | Good |

|  | Example 15 | Example 16 | Example 17 | Comparative Example 3 | Comparative Example 4 | Comparative Example 5 |
|---|---|---|---|---|---|---|
| Ratio R ($N_1/N_n$) | 1.51 | 1.53 | 1.49 | 1.51 | 1.50 | 1.50 |
| Density of node portion (/mm³) | $2.1 \times 10^6$ | $2.7 \times 10^6$ | $2.0 \times 10^6$ | $2.1 \times 10^6$ | $2.0 \times 10^6$ | $2.0 \times 10^6$ |
| Average value of orientation angle in x direction (°) | 66.3 | 66.7 | 66.4 | 66.2 | 66.0 | 66.0 |
| Average value of orientation angle in y direction (°) | 50.7 | 50.5 | 50.7 | 51.3 | 52.1 | 52.1 |
| Average value of orientation angle in z direction (°) | 54.1 | 52.2 | 53.5 | 53.5 | 53.1 | 53.1 |
| Minimum value of $\theta_d$ (°) | 11.6 | 12.2 | 12.9 | 12.7 | 13.00 | 13.00 |
| Average fiber diameter of carbon fiber (μm) | 1.7 | 1.8 | 1.8 | 1.5 | 1.4 | 1.4 |
| Maximum or minimum fiber diameter (μm) | 2.0 (maximum) | 2.1 (maximum) | 2.1 (maximum) | 0.5 (minimum) | 0.3 (minimum) | 0.3 (minimum) |
| Bulk density (kgm⁻³) | 130 | 175 | 145 | 110 | 100 | 100 |
| Carbon foam surface area (cm²) | 484 | 484 | 484 | 265 | 262 | 262 |
| Carbon content (mass %) | 99 | 99 | 99 | 99 | 99 | 99 |
| Oxygen atom concentration (mass %) | 0.73 | 0.48 | 0.35 | 0.80 | 1.01 | 1.01 |
| Graphite concentration after oxidation (at %) | 76.5 | 77.2 | 79.8 | 77.1 | 76.1 | 76.1 |
| C—OH concentration after oxidation (at %) | 10.6 | 9.8 | 9.1 | 10.1 | 10.8 | 10.8 |
| C=O concentration after oxidation (at %) | 10.1 | 10.6 | 9.5 | 10.4 | 10.2 | 10.2 |
| COOH concentration after oxidation (at %) | 2.8 | 2.4 | 1.6 | 2.4 | 2.9 | 2.9 |
| Oxygen-containing functional group concentration after oxidation (at %) | 23.5 | 22.8 | 20.2 | 22.9 | 23.9 | 23.9 |
| Void between electrodes (mm) | 0 | 0 | — | — | 11 | 0 |
| Void between electrodes (%) | 0 | 0 | 0 | — | 6.9 | 0 |
| Embedding depth (μm) | 0 | 0 | 0 | 0 | 0 | — |
| Adhesive area (%) | 60 | 100 | 100 | 100 | 100 | No adhesion |
| Current efficiency at 10 cycles (CE %) | 96.2 | 96.1 | 94.9 | 94.9 | 96.4 | — |
| Voltage efficiency at 10 cycles (VE %) | 95.1 | 95.6 | 93.0 | 80.5 | 71.3 | — |
| Energy efficiency at 10 cycles (EE %) | 91.5 | 91.9 | 88.3 | 76.3 | 68.7 | — |
| Battery leakage | Good | Good | Good | Good | Good | Poor |
| Wettability | Good | Good | Fair | Good | Good | Good |

Figure 7:
FIG. 7 is a SEM image of a joint between carbon foam and Nafion 211 of the assembly of Example 9.

The two samples obtained were cut to 150 mm×120 mm and joined to Nafion 211, which had been cut to 200 mm×160 mm, under the conditions of 125° C. for 3 minutes by a press machine. The SUS spacer was set to 500 μm, and a pressure of 2 MPa was applied thereon. An assembly of Example 9 was prepared in this way. Details of the obtained assembly are listed in Table 2. FIG. 7 illustrates how the carbon foam of the obtained assembly is adhered only by the surface.

Example 10

Processes up to carbonization were performed in the same manner as in Example 9, and two carbon foams were prepared. Subsequently, one of the obtained samples was oxidized under the same conditions as in Example 9, and the other one was subjected to heat treatment at 610° C. for 1.0 hour under a dry air stream. Carbon foams whose surfaces had been treated in two ways of Example 10 were obtained. The dry air flow rate was set to 1 L/min. Details of the carbon foam obtained by heat treatment at 610° C. for 1.0 hour under a dry air stream were listed in Table 2. The measured fiber diameter was within ±20% of the average fiber diameter of all fibers. In addition, the surface area of both carbon foams, which had been oxidized under the two sets of conditions, did not change after the carbonization.

Figure 8:
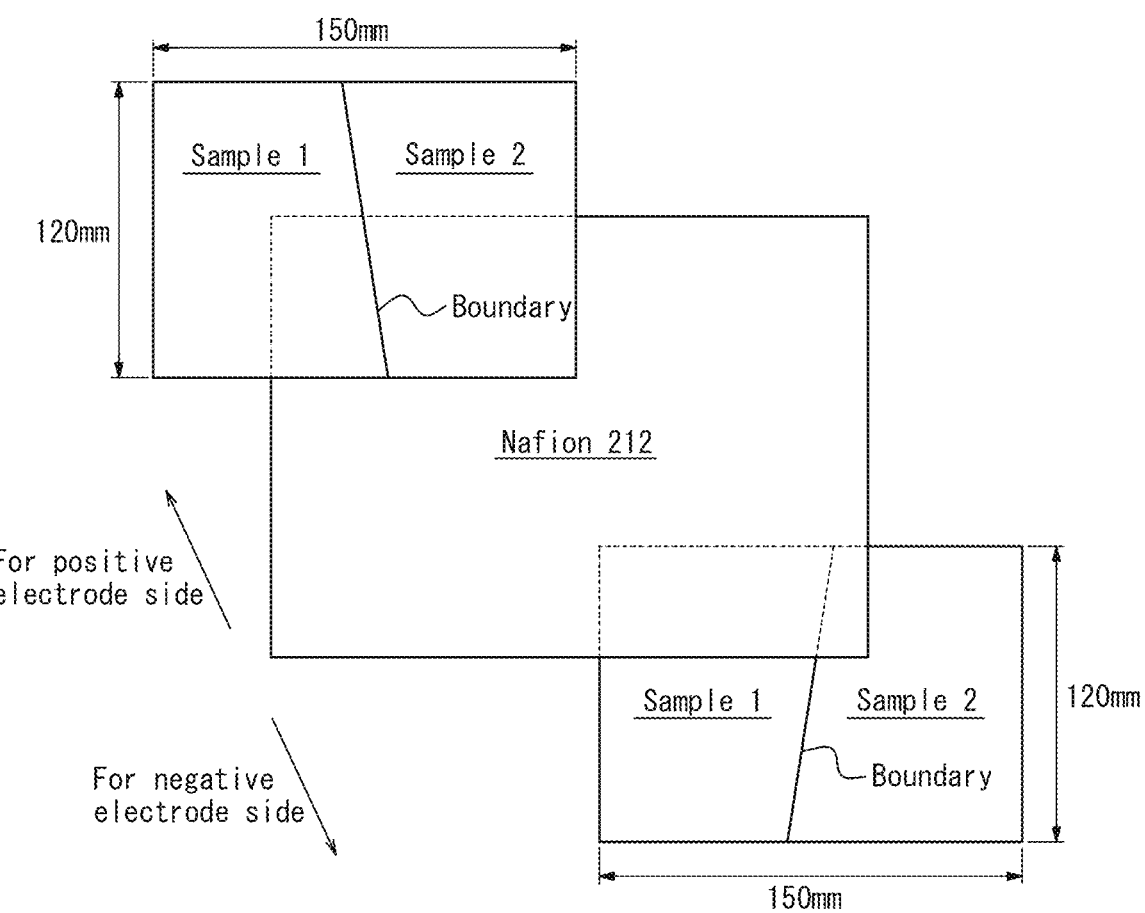
FIG. 8 illustrates arrangement of two types of carbon foam samples on a positive electrode side and a negative electrode side in the assembly of Example 11.

The two types of obtained samples were cut into a right-angled trapezoid having a long side of 100 mm, a short side of 50 mm and a height of 120 mm, two pieces for one type. Both the two types of samples were used for a positive electrode side and a negative electrode side of an assembly. The hypotenuses of the right-angled trapezoids were opposed to each other so that the long side of one sample and the short side of the other sample were continuous, and the samples were arranged so as to fit within 150 mm×120 mm. In addition, the samples were arranged so that the boundary between the two types of samples for the positive electrode side and the boundary between the two types of samples for the negative electrode side intersected with each other when viewed from the normal direction of the main surface of the sample, as illustrated in FIG. 8. Subsequently, they were joined to Nafion 212, which had been cut to 200 mm×160 mm, under the conditions of 125° C. for 3 minutes by a press machine. The SUS spacer was set to 500 μm, and a pressure of 2 MPa was applied thereon. An assembly of Example 10 was prepared in this way. Details of the obtained assembly are listed in Table 2.

When the assembly was assembled into a cell, the cell was assembled so that the side of the sample treated at 610° C. was on an inlet side of liquid. Measurement was performed.

Example 11

The same carbon foams as in Example 10 were prepared as the carbon foams of Example 11. The measured fiber diameter was within ±20% of the average fiber diameter of all fibers. In addition, the surface area of the oxidized carbon foam did not change after the carbonization. The obtained two types of samples whose oxidation treatment temperatures were different were cut into a right-angled trapezoid having a long side of 100 mm, a short side of 50 mm and a height of 120 mm, one piece for one type. The two types of samples were used for one side of an electrode, and the samples were arranged so as to fit within 150 mm×120 mm, as in Example 10. Subsequently, the samples were joined to Nafion 212, which had been cut to 200 mm×160 mm, under the conditions of 125° C. for 3 minutes by a press machine. The SUS spacer was set to 300 μm, and a pressure of 2 MPa was applied thereon. An assembly of Example 11, in which the carbon foam was joined to only one side of Nafion 212, was prepared in this way. Details of the obtained assembly are listed in Table 2.

When the assembly was assembled into a cell, the cell was assembled so that the carbon foam of the assembly described above was arranged on the negative electrode, and the carbon foam treated at 600° C. under a dry air stream prepared in Example 11 was arranged on the positive electrode, and the negative electrode was arranged so that the side of the sample treated at 610° C. was on an inlet side of liquid. Measurement was performed.

Example 12

Carbon foams of Example 12 were prepared in the same manner as in Example 10. However, among the two types of samples obtained by oxidation under dry air, only the sample oxidized at 600° C. was cut into a trapezoid having a long side of 99 mm, a short side of 49 mm and a height of 120 mm. The two types of samples were used for both sides of an electrode, and the samples were arranged so as to fit within 150 mm×120 mm. The samples were joined to Nafion 212, which had been cut to 200 mm×160 mm, under the conditions of 125° C. for 3 minutes by a press machine. At that time, a gap of 1 mm was provided at the joint. An assembly was prepared under the same conditions as in Example 10 other than this. Details of the obtained assembly are listed in Table 2.

Example 13

Carbon foams of Example 13 were prepared in the same manner as in Example 10. However, among the two types of samples obtained by oxidation under dry air, only the sample oxidized at 600° C. was cut into a trapezoid having a long side of 96 mm, a short side of 46 mm and a height of 120 mm. The two types of samples were used for both sides of an electrode, and the samples were arranged so as to fit within 150 mm×120 mm. The samples were joined to Nafion 212, which had been cut to 200 mm×160 mm, under the conditions of 125° C. for 3 minutes by a press machine. At that time, a gap of 4 mm was provided at the joint. An assembly was prepared under the same conditions as in Example 10. Details of the obtained assembly are listed in Table 2.

Example 14

Figure 9:
FIG. 9 is a SEM image of a joint between carbon foam and Nafion 212 of the assembly of Example 14.

Carbon foams of Example 14 were prepared in the same manner as in Example 10. However, the samples oxidized under dry air and Nafion 212 were joined under the conditions of 140° C. for 3 minutes by a press machine. An assembly was prepared under the same conditions as in Example 10 other than this. Details of the obtained assembly are listed in Table 2. FIG. 9 illustrates how the carbon foam of the obtained assembly is embedded in and adhered to the membrane.

Example 15

Carbon foams of Example 15 were prepared in the same manner as in Example 10. However, the samples oxidized under dry air and Nafion 212 were joined under the conditions of 115° C. for 3 minutes by a press machine. An assembly was prepared under the same conditions as in Example 10 other than this. Details of the obtained assembly are listed in Table 2. Peeling was observed at the ends of the obtained assembly, and 60% of the electrode as a whole was adhered to the membrane.

Example 16

A melamine resin foam (dimensions: 400 mm×400 mm×25 mm, manufactured by BASF, product name "BASOTECT W") was prepared as a material of carbon foam, a SUS plate having a thickness of 0.6 mm was placed around the sample as a spacer, and the melamine resin foam was sandwiched between graphite plates having a thickness of 10 mm from above and below and introduced into a vacuum hot press machine (KVHC-II) manufactured by KITAGAWA SEIKI CO., LTD. Processes up to carbonization were performed under the same conditions as in Example 9 other than this, and a high-density carbon foam of Example 16 was prepared. Subsequently, it was subjected to heat treatment at 600° C. for 1.5 hours under a dry air stream. Details of the obtained carbon foam are listed in Table 2. The measured fiber diameter was within ±20% of the average fiber diameter of all fibers. In addition, the surface area of the oxidized carbon foam did not change after the carbonization.

An assembly was prepared in the same manner as in Example 10, using the high-density carbon foam sample of Example 16 described above and a sample (raw material dimensions: 400 mm×400 mm×20 mm) prepared with the same method as in Example 9 as two types of samples. Details of the obtained assembly are listed in Table 2.

When the assembly was assembled into a cell, the cell was assembled so that the side of the sample of the high-density carbon foam newly prepared in Example 16 was on an inlet side of liquid, in other words, the cell was assembled so that most part of the high-density carbon foam samples joined to two sides overlap each other when viewed from the normal direction of the main surface of the Nafion 212. Measurement was performed.

Example 17

An assembly of Example 17 was prepared in the same manner as in Example 10. The conditions were the same as in Example 10 except that a sample that had been subjected to surface treatment which was heat treatment at 550° C. for 1 hour under a dry air stream as the oxidation conditions after the carbonization was used instead of the sample of Example 10 that had been subjected to surface treatment which was heat treatment at 610° C. for 1.0 hour under a dry air stream. Details of the carbon foam used for the assembly are listed in Table 2. The measured fiber diameter was within ±20% of the average fiber diameter of all fibers. The surface area of the oxidized carbon foam did not change after the carbonization. Details of the obtained assembly are listed in Table 2.

Comparative Example 3

Carbon foams of Comparative Example 3 were prepared as in Example 9. However, in the pressing process, evacuation was not performed, and the pressing was performed at a normal pressure in a nitrogen atmosphere. The carbonization process was performed under the same conditions as in Comparative Example 1. Details of the obtained carbon foam are listed in Table 2. A central portion of the obtained carbon foam disappeared. The diameter of 50% of the fibers was less than 80% of the average fiber diameter.

Oxidation was performed in the same manner as in Example 9. The oxidized carbon foams were arranged with a visually more-homogeneous surface of the carbon foams as the contact surface with Nafion, and the carbon foams and the Nafion were assembled. Details of the obtained assembly are listed in Table 2. Note that the sheet area was further reduced to 230 cm$^2$ after the oxidation treatment.

Comparative Example 4

Carbon foams of Comparative Example 4 were prepared as in Comparative Example 3. A central portion of the obtained carbon foam disappeared. The diameter of 50% of the fibers was less than 80% of the average fiber diameter. Oxidation under dry air was performed in the same manner as in Example 10 to obtain two types of samples. Details of the carbon foam obtained by heat treatment at 610° C. for 1.0 hour under a dry air stream are listed in Table 2. Note that the sheet area was further reduced to 228 cm$^2$ after the oxidation treatment.

Only the sample oxidized at 600° C. was cut into a trapezoid having a long side of 89 mm, a short side of 39 mm and a height of 120 mm. The two types of samples were used for both sides of an electrode, and the samples were arranged so as to fit within 150 mm×120 mm. The samples were joined to Nafion 212, which had been cut to 200 mm×160 mm, under the conditions of 125° C. for 3 minutes by a press machine. At that time, a gap of 11 mm was provided at the joint. An assembly was prepared under the same conditions as in Example 10 other than this. Details of the obtained assembly are listed in Table 2.

Comparative Example 5

Processes up to oxidation were performed in the same manner as in Comparative Example 4, and carbon foams of Comparative Example 5 were prepared. The obtained two types of samples were cut out in the same manner as in Example 10. Both the two types of samples were used for both sides of an electrode, and the samples were arranged so as to fit within 150 mm×120 mm. After that, it was incorporated into a redox flow battery cell without joining with Nafion 212, and evaluation was performed. However, the measurement was interrupted because leakage of electrolytic solution occurred.

<SEM Observation>

A part of the carbon foam at a location of about 2 cm from the end of a side was cut out from each of the two sides of the surface of the carbon foam of Example 1 (2 locations in total), and parts of the carbon foam at 2 locations in the center of the surface were also cut out. For each sample, SEM images were imaged at a magnification of 10,000 times using a scanning electron microscope on a total of 20 locations from 2 surfaces and 3 cross sections. For each location, the fiber diameter of any one carbon fiber in the image of carbon fibers included in the SEM image was measured and taken as the fiber diameter at the location. An average value was calculated by averaging the fiber diameters at the 20 locations. The obtained average value is listed in Table 1 together with a maximum or minimum value of the fiber diameter at the 20 locations, depending on which one has a larger variation from the average value. For each carbon foam of Examples 2 to 17 and Comparative Examples 1 to 5, SEM images were imaged in the same manner as in Example 1, and an average value and a minimum or maximum value of the fiber diameter were obtained. However, with respect to the partially burnt portion in Comparative Example 1, the outer circumference of the burnt portion was sampled and imaged, which was different from the portion imaged in Example 1.

Figure 10:
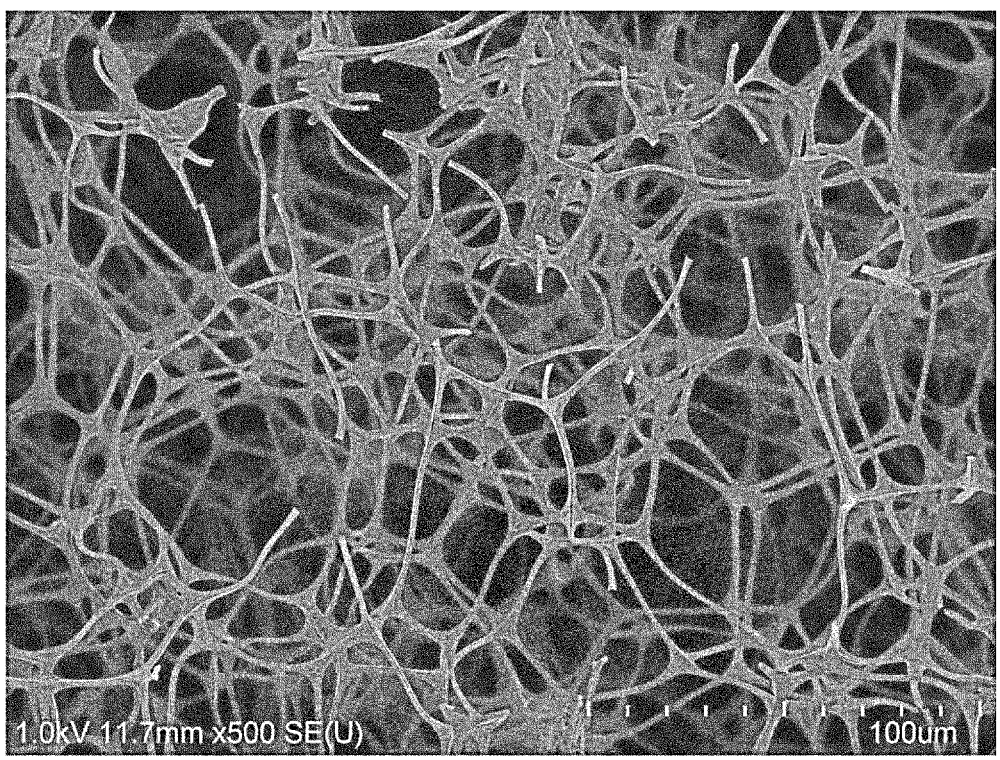
FIG. 10 is a SEM image of the carbon foam of Example 1.
Figure 11A:
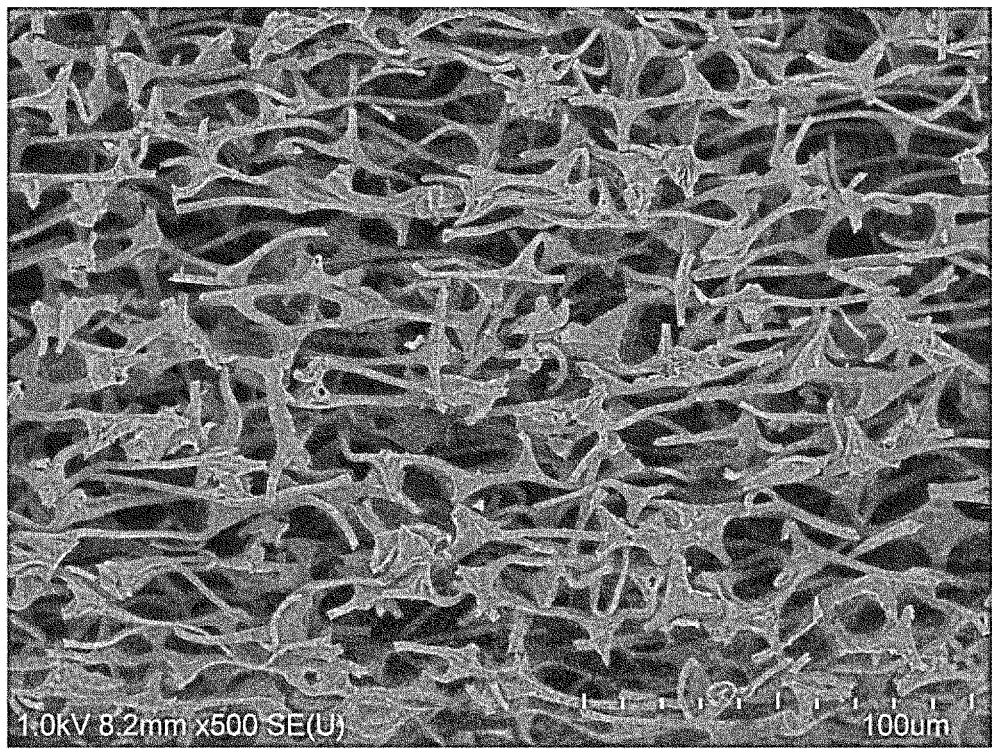
FIG. 11A is a SEM image of a cross section of the carbon foam of Example 3.
Figure 11B:
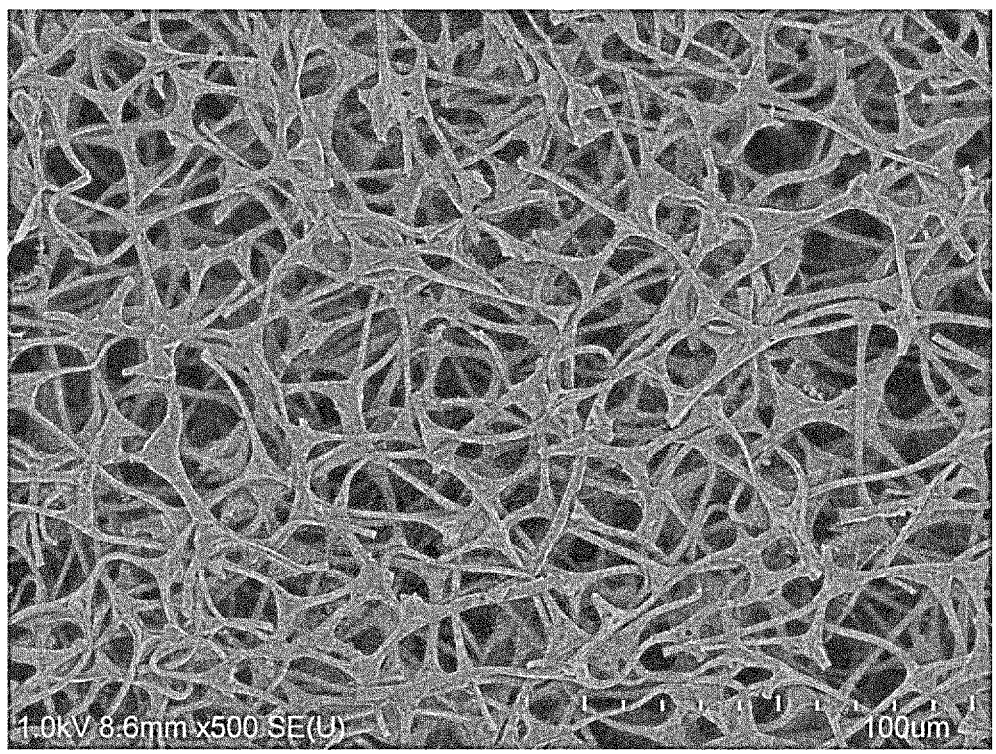
FIG. 11B is a SEM image of a surface of the carbon foam of Example 3.

FIG. 10 is a SEM image of a cross section of the carbon foam of Example 1. FIG. 11A is a SEM image of a cross section (a cross section in the direction in which the compressive load is applied) of the carbon foam of Example 3. FIG. 11B is a SEM image of a surface (a surface perpendicular to the direction in which the compressive load is applied) of the carbon foam of Example 3. The magnification is 500 times for all SEM images.

As is apparent from FIGS. 11A and 11B, in the carbon foam of Example 3, the linear portions of the carbon fibers are joined at the node portions, and the linear portions are oriented in a direction perpendicular to the direction in which the compressive load is applied. On the other hand, in the carbon foam of Example 1 illustrated in FIG. 10, the linear portions of the carbon fibers are isotropically oriented.

<Structural Analysis by X-Ray CT>

Figure 12:
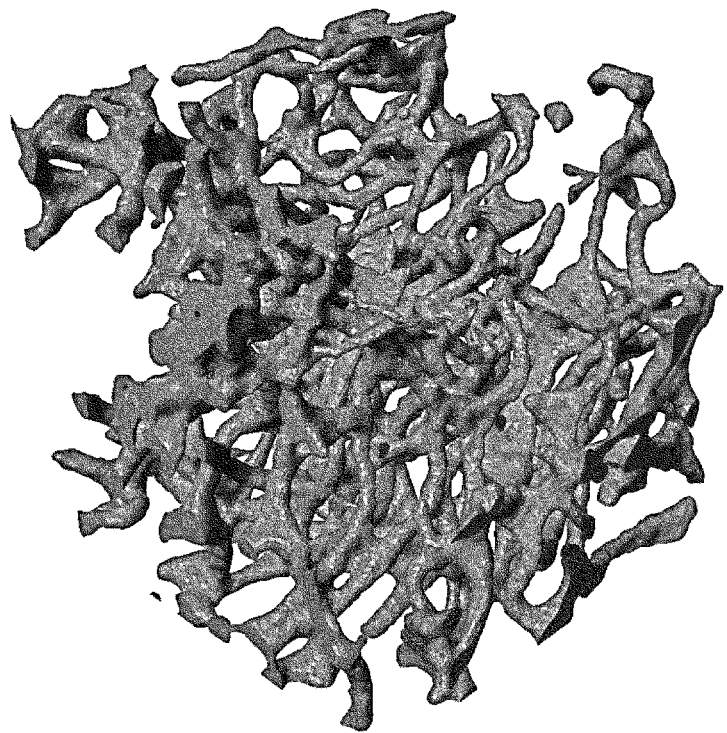
FIG. 12 is an X-ray CT analysis image obtained with the carbon foam of Example 1.
Figure 13:
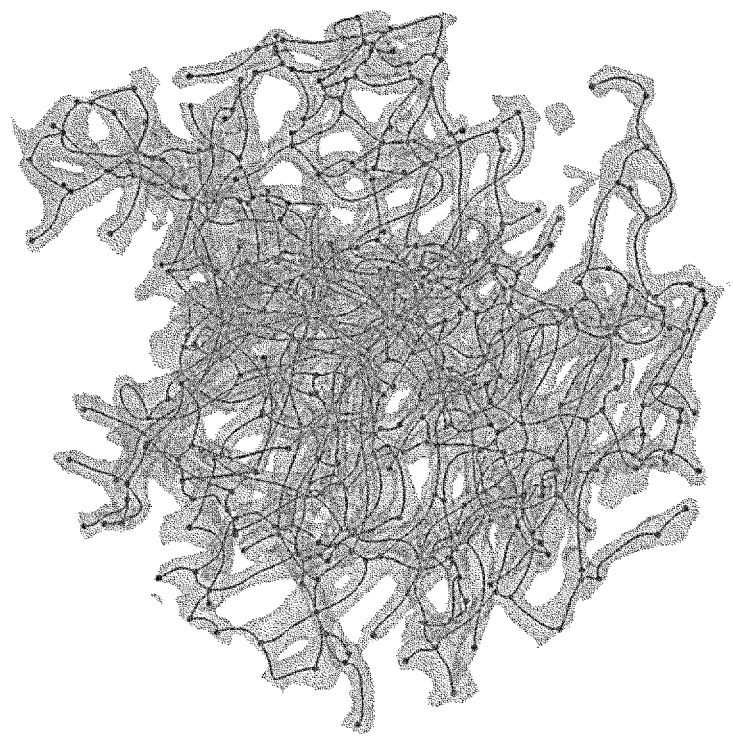
FIG. 13 is an image obtained by subjecting the image of FIG. 12 to image processing for line and node detection.

The carbon foams of Examples 1 to 17 and Comparative Examples 1 to 5 were subjected to structural analysis by X-ray CT. Specifically, in order to facilitate X-ray imaging, electroless copper plating was first performed on each of the carbon foams of Examples and Comparative Examples. Subsequently, a specimen was collected from each carbon foam, and structural analysis was performed on the collected specimens using a high-resolution 3D X-ray microscope nano3DX (manufactured by Rigaku Corporation). The following describes the electroless plating conditions and the X-ray CT analysis conditions in detail. As an example of the results, FIG. 12 is an X-ray CT analysis image obtained with the carbon foam of Example 1, and FIG. 13 is an image obtained by subjecting the image of FIG. 12 to image processing for line and node detection.

[Electroless Plating Condition]

The sample was immersed in OPC Condiclean MA (manufactured by Okuno Chemical Industries Co., Ltd., diluted to 100 mL/L with distilled water) at 70° C. for 5 minutes, and then washed with distilled water for 1 minute. Subsequently, the sample was immersed in OPC Predip 49L (manufactured by Okuno Chemical Industries Co., Ltd., diluted to 10 mL/L with distilled water and added with 98% sulfuric acid at 1.5 mL/L) at 70° C. for 2 minutes, and then washed with distilled water for 1 minute. Subsequently, the sample was immersed in a solution, which was obtained by mixing OPC Inducer 50 AM (manufactured by Okuno Chemical Industries Co., Ltd., diluted to 100 mL/L with distilled water) and OPC Inducer 50 CM (manufactured by Okuno Chemical Industries Co., Ltd., diluted to 100 mL/L with distilled water) at 1:1, at 45° C. for 5 minutes, and then washed with distilled water for 1 minute. Subsequently, the sample was immersed in OPC-150 Crystal MU (manufactured by Okuno Chemical Industries Co., Ltd., diluted to 150 mL/L with distilled water) at room temperature for 5 minutes, and then washed with distilled water for 1 minute. Subsequently, the sample was immersed in OPC-BSM (manufactured by Okuno Chemical Industries Co., Ltd., diluted to 125 mL/L with distilled water) at room temperature for 5 minutes. Subsequently, the sample was immersed in a solution, which was obtained by mixing Chemical Copper 500A (manufactured by Okuno Chemical Industries Co., Ltd., diluted to 250 mL/L with distilled water) and Chemical Copper 500B (manufactured by Okuno Chemical Industries Co., Ltd., diluted to 250 mL/L with distilled water) at 1:1, at room temperature for 10 minutes, and then washed with distilled water for 5 minutes. Subsequently, the sample was subjected to vacuum drying at 90° C. for 12 hours to dry the moisture.

[X-Ray Condition]
X-ray target: Cu
X-ray tube voltage: 40 kV
X-ray tube current: 30 mA
[Imaging Condition]
Number of projections: 1500 sheets
Rotation angle: 180°
Exposure time: 20 seconds/sheet
Spatial resolution: 0.54 μm/pixel
[X-Ray CT Analysis Condition]

By using the median filter, the obtained three-dimensional images were processed in one pixel, and the processed images were binarized using Otsu's algorithm. Subsequently, Centerline Editor (Ver. 7) of Simpleware software manufactured by JSOL Corporation with default setting values was used to remove lines of 2.16 μm or less as noise, and then the number of the node portions and the number of the linear portions in a measurement field of view of 300 μm×300 μm×300 μm were determined. For Comparative Examples 1 to 5, analysis was performed on a portion having high homogeneity visually.

With the above structural analysis, the number Nn of the node portions and the number Nl of the linear portions included in the specimen, the density of the node portions, and the average values of the orientation angles with respect to the three mutually orthogonal directions (x, y, z) were determined. The results are listed in Tables 1 and 2. The orientation angles in Tables 1 and 2 were obtained by setting the direction in which the compressive load was applied as x direction and the directions perpendicular to the direction in which the compressive load was applied as y direction and z direction. In addition, the minimum value of Od in Tables 1 and 2 is a minimum value of the difference between the orientation angle with respect to the x direction and the orientation angle with respect to the y direction or the z direction.

According to Tables 1 and 2, the ratio R of the number N1 of the linear portions to the number Nn of the node portions of the carbon foams of Examples 1 to 17 and Comparative Examples 1 to 5 are in the range of 1.4 to 1.55. With respect to other materials such as a structure like carbon fiber nonwoven fabric, the ratio R of the number N1 of the linear portions to the number Nn of the node portions is 1.29 or less, outside the range of 1.4 to 1.55. This indicates that the range is a characteristic numerical value because of the structure of the carbon foam of the present disclosure.

<Measurement of Bulk Density>

The dimensions of the carbon foam were measured using vernier calipers, and the obtained dimensions were used to determine the bulk volume Vbulk of the carbon foam. Next, the mass M of the carbon foam was measured using a precision balance. With the obtained mass M and bulk volume Vbulk, the bulk density $\rho bulk$ ($kgm^{-3}$) of the carbon foam was determined using the equation (2) described above. The results are listed in Tables 1 and 2.

<Measurement of Weight Per Unit Area>

A part of the carbon foam in a size of 3 cm×3 cm was cut out at 5 locations on the surface of each carbon foam of Examples 1 to 8 and Comparative Examples 1 and 2, where the 5 locations were the center of each of the four sides of the rectangle and the center of the surface. The weight of the cut carbon foam was measured using a precision balance. The measured weight was divided by 3 cm×3 cm to obtain the weight per unit area ($m^2$). An average value was calculated by averaging the weights per unit area at the 5 locations. The obtained average value is listed in Table 1 together with a maximum or minimum value of the weight per unit area at the 5 locations, depending on which one has a larger variation from the average value. In the case where all the cut parts were burnt down, the weight per unit area was regarded as zero.

<Carbon Content>

The carbon content of the carbon foam could be obtained by X-ray fluorescence measurement using an X-ray fluorescence analyzer ZSX-100E (wavelength dispersion type, Rh tubular lamp) manufactured by Rigaku Corporation. The area of the sample was 20 mmϕ or more. The results are listed in Tables 1 and 2.

<Oxygen Atom Concentration>

The oxygen content of the carbon foam could be obtained by X-ray fluorescence measurement using an X-ray fluorescence analyzer ZSX-100E (wavelength dispersion type, Rh tubular lamp) manufactured by Rigaku Corporation. The sample used was in a size of 20 mmϕ or more. The results are listed in Tables 1 and 2.

<Surface Functional Group Concentration>

The oxygen-containing functional group concentration on the surface of the carbon foam was measured using an X-ray photoelectron spectrometer (PerkinElmer, ESCA-5500MT). The C1s peak was fitted by four Gaussian distributions with joining energies of 284.4 eV (graphite), 285.6 eV (C—OH), 287.0 eV (C=O) and 288.6 eV (COOH) as peaks. The ratio of the area of each peak to the total area of the four peaks corresponded to the ratio of the number of carbon atoms contained in each functional group to the total number of carbon atoms, and this value is taken as the surface functional group concentration. The results are listed in Tables 1 and 2.

<Evaluation of Conductivity>

The resistance of the carbon foams of Examples 1 to 8 and Comparative Examples 1 and 2 were measured. Specifically, the resistance was measured by respectively joining a 10 mm×10 mm copper plate to the tip of each of two electrodes used for resistance measurement, pressing the surface of the copper plate opposite to the surface joined to the electrode of the two electrodes against the carbon foam with an interval of 10 cm, and measuring the resistance with a digital multimeter 7461A. The results are listed in Table 1.

By comparing the results of Examples 1 and 3 and Comparative Example 1 in Table 1, it is understood that Examples 1 and 3 in which the carbon foam had good homogeneity had low resistance and high conductivity.

<Evaluation 1 of Redox Flow Battery>

The following evaluation cell was used for the evaluation of redox flow batteries of the carbon foams of Examples 1 to 8 and Comparative Examples 1 and 2. A cell including a Viton rubber gasket, a Teflon® (Teflon is a registered trademark in Japan, other countries, or both) flow path frame, a graphite separator, and a stainless-steel end plate was used. Nafion 211 purchased from Aldrich was used as the ion exchange membrane. The thickness of the gasket was adjusted so that the compressibility of the electrode was 52%. A membrane cut to 50 mm×80 mm, two pieces of carbon foam cut to 33 mm×30 mm, and constituent members of the cell were assembled in a predetermined order and fastened with a stainless-steel bolt at a predetermined torque. The assembled cell was connected to an electrolytic solution circulation device composed of an electrolytic solution tank and a liquid feeding pump. The electrolytic solution tank was added with 30 ml of a vanadium sulfate solution having a vanadium ion concentration of 1.5 M, a vanadium ion valence of 3.5 valence and a sulfate ion concentration of 4.5 M, and circulated at a flow rate of 100 ml/min. A charge/discharge test was performed with the constant current method using a potentiostat VSP manufactured by BioLogic. The voltage was in a range of 1.00 V to 1.55 V, and the current density was 80 mA/cm². With the average voltages Vc and Vd during charging and discharging, the cell resistance was calculated by the following equation. The results are listed in Table 1.

$$(Vc-Vd)/(2\times0.08)(\Omega cm^2)$$

<Evaluation 2 of Redox Flow Battery>

The following evaluation cell was used for the evaluation of redox flow batteries of the carbon foams of Examples 9 to 17 and Comparative Examples 3 to 5. A cell including a Viton rubber gasket, a vinyl chloride frame, a graphite separator, and a stainless-steel end plate was used. Nafion 211 or Nafion 212 purchased from Aldrich was used as the ion exchange membrane. The thickness of the gasket was adjusted so that the compressibility of the electrode was 67%. The prepared assembly, or a membrane cut to 5200 mm×160 mm and a carbon foam cut to 150 mm×120 mm, and constituent members of the cell were assembled in a predetermined order and fastened with a stainless-steel bolt at a predetermined torque. The assembled cell was connected to an electrolytic solution circulation device composed of an electrolytic solution tank and a liquid feeding pump. The electrolytic solution tank was added with 4 L of a vanadium sulfate solution having a vanadium ion concentration of 1.5 M, a vanadium ion valence of 3.5 valence and a sulfate ion concentration of 4.5 M, and circulated at a flow rate of 200 ml/min. A charge/discharge test was performed with the constant current method using a bipolar power supply manufactured by KIKUSUI ELECTRONICS CORPORATION. The voltage was in a range of 1.00 V to 1.55 V, and the current density was 80 mA/cm². With the charge capacity Qc and discharge capacity Qd at 10 cycles and the average voltages Vc and Vd during charging and discharging, the current efficiency CE, voltage efficiency VE, and power efficiency EE were obtained by the following equations, respectively.

$$CE:Qd/Qc(\%)$$

$$VE:Vd/Vc(\%)$$

$$EE:CE\times VE(\%)$$

<Embedding Depth>

The embedding depth at the interface between the carbon foam and the membrane of the assembly was determined from a SEM image imaged at a magnification of 2,000 times using a scanning electron microscope. The assembly was cut, and images were imaged at any 3 locations in the membrane thickness direction. In the case where the ion exchange membrane side was deformed and the carbon foam was embedded therein in the obtained SEM image, an average value of the embedding depth from the adhesive interface was defined as the embedding depth. In the case where no embedding was found in all the three images, the embedding depth was 0 μm, and it was judged that they were adhered only by the carbon surface.

<Adhesive State>

After an assembly was formed, the adhered carbon foam was arranged as the lower surface, and only a portion of the ion exchange membrane was lifted by hand. At that time, if there is no peeling caused by the weight of the electrode itself on the interface between the ion exchange membrane and the electrode at all the adhesive surfaces of the assembly, it was judged that they were adhered on all the surfaces (100%). If any one of the adhesive surfaces of the assembly was peeled off and the electrode fell, it was judged that there was no adhesion. Further, if the ion exchange membrane was bent and peeling was observed at a part of the end, it was judged that they were partially adhered, and an adhesive area ratio was calculated with the total peeled area.

<Evaluation of Wettability>

For each carbon foam of Examples 1 to 17 and Comparative Examples 1 to 5, a tip of a dropper containing distilled water was placed at a position 1 mm above the surface of the carbon foam, the dropper was pressed to form a droplet, and the droplet was brought into contact with the surface of the carbon foam and separated from the dropper. At that time, if all the distilled water of the droplet was impregnated into the carbon foam within 10 seconds, the wettability of the carbon foam was judged to be good. If only a part of the distilled water of the droplet was impregnated into the carbon foam after 10 seconds, or if the contact angle between the carbon foam and the droplet of distilled water was less than 90 degrees, the wettability of the carbon foam was judged to be fair. If the contact angle between the carbon foam and the droplet of distilled water was 90 degrees or more, the wettability of the carbon foam was judged to be poor. The results are listed in Tables 1 and 2.

<Evaluation of Glass Transition Temperature (Tg) of Ion Exchange Membrane>

The glass transition temperature of the ion exchange membrane used in Examples and Comparative Examples was measured using a dynamic viscoelasticity meter RSA-G2 manufactured by TA Instruments. A membrane was cut out in a strip shape with a length of 20 mm and a width of 5 mm. While applying AC strain having a frequency of 1 Hz and an amplitude of 0.2% to the cut membrane, the temperature was raised from room temperature to 200° C. at a heating rate of 5° C./min under a nitrogen stream. The storage modulus, loss modulus, and loss tangent at each temperature were obtained from AC stress response to the applied AC strain. A loss tangent-temperature curve was obtained, and the temperature at the peak of the curve was defined as the glass transition temperature. The obtained glass transition temperature was 104° C. for Nafion 211 and 104° C. for Nafion 212.

<Membrane Thickness of Ion Exchange Membrane>

After allowing the ion exchange membrane to stand in a thermostatic chamber at a temperature of 23° C. and a relative humidity of 65% for 12 hours or longer, the membrane thickness of the ion exchange membrane was measured using a contact-type thickness meter (manufactured by Toyo Seiki Seisaku-sho, Ltd.) at any 6 locations of the used sample. The average membrane thickness of Nafion 211 was 25 μm, and the membrane thickness at all the measured locations was within ±20% of the average membrane thickness. The average membrane thickness of Nafion 212 was 50 μm, and the membrane thickness at all the measured locations was within ±20% of the average membrane thickness.

INDUSTRIAL APPLICABILITY

According to the present disclosure, it is possible to obtain an overall homogeneous carbon foam, which is useful in electrode applications and filter applications.

REFERENCE SIGNS LIST 1, 10 membrane electrode assembly
2, 11, 111 ion exchange membrane
3 carbon foam
12, 112 electrode
13 separator
14 current collector
20 cell
100 redox flow battery
101 electrolytic bath
102, 103 tank
104, 105 pump
106 power source
112a positive electrode
112b negative electrode
H through hole
S surface

The invention claimed is:

1. A carbon foam formed of carbon fibers, wherein
at 90% or more of any 20 locations, the carbon fibers have a fiber diameter that is within ±20% of an average fiber diameter.

2. The carbon foam according to claim 1, having a surface of 150 cm² or more.

3. The carbon foam according to claim 1, wherein an average fiber diameter of the carbon fibers is 0.1 μm or more and 5.0 μm or less.

4. A carbon foam formed of carbon fibers, wherein
at any 5 locations on a surface, a weight per unit area of 3 cm×3 cm is within ±50% of an average value of weight per unit area.

5. The carbon foam according to claim 4, wherein
among carbon atoms measured by surface analysis by X-ray photoelectron spectroscopy, a proportion of carbon atoms having a hydroxy group is 5 at % or more and 15 at % or less.

6. The carbon foam according to claim 4, wherein
among carbon atoms measured by surface analysis by X-ray photoelectron spectroscopy, a proportion of carbon atoms forming a carbonyl group is 9 at % or more and 15 at % or less.

7. The carbon foam according to claim 4, wherein
among carbon atoms measured by surface analysis by X-ray photoelectron spectroscopy, a proportion of carbon atoms forming a carboxy group is 0.1 at % or more and 5.0 at % or less.

8. The carbon foam according to claim 4, having a surface of 150 cm² or more.

9. The carbon foam according to claim 4, wherein an average fiber diameter of the carbon fibers is 0.1 μm or more and 5.0 μm or less.

10. An assembly, which is a laminate in which at least a part of the carbon foam according to claim 1 is adhered to at least one surface of an ion exchange membrane having a first surface and a second surface.

11. The assembly according to claim 10, wherein two or more pieces of the carbon foam are adhered to one surface of the ion exchange membrane.

12. The assembly according to claim 10, which is a laminate in which the carbon foam is adhered to the first surface and the second surface.

13. The assembly according to claim 10, which is a laminate in which 30% or more of a surface of the carbon foam is adhered to the ion exchange membrane.

14. The assembly according to claim 10, wherein
two or more pieces of the carbon foam are adhered to one surface of the ion exchange membrane, and
for the two or more pieces of carbon foam, a void between two pieces of carbon foam adjacent to each other is 10 mm or less.

15. The assembly according to claim 10, wherein
two or more pieces of the carbon foam are adhered to one surface of the ion exchange membrane, and
for the two or more pieces of carbon foam, a void ratio between two pieces of carbon foam adjacent to each other is 5% or less.

16. The assembly according to claim 10, wherein
the ion exchange membrane has a membrane thickness of 1 μm or more and 100 μm or less.

17. The assembly according to claim 10, wherein
the ion exchange membrane has a membrane thickness that is within ±20% of an average membrane thickness.

18. The assembly according to claim 10, wherein
on an adhesive surface between the carbon foam and the ion exchange membrane, an embedding depth of the carbon foam in the ion exchange membrane is 5 μm or less.

19. The assembly according to claim 10, wherein
two or more pieces of the carbon foam having different oxidation states on carbon surfaces are adhered to at least one surface of the ion exchange membrane.

20. A method of manufacturing the assembly according to claim 10, wherein
the ion exchange membrane and the carbon foam are thermocompression bonded under a temperature condition of Tg of the ion exchange membrane+50° C. or lower.

* * * * *